(12) United States Patent
Mimura et al.

(10) Patent No.: US 11,151,871 B2
(45) Date of Patent: Oct. 19, 2021

(54) AUTONOMOUS DRIVING VEHICLE INFORMATION PRESENTATION APPARATUS

(71) Applicant: HONDA MOTOR CO., LTD., Tokyo (JP)

(72) Inventors: Yoshitaka Mimura, Wako (JP); Takashi Oshima, Wako (JP); Yuji Tsuchiya, Wako (JP); Yuki Kizumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/117,220

(22) Filed: Dec. 10, 2020

(65) Prior Publication Data
US 2021/0174673 A1 Jun. 10, 2021

(30) Foreign Application Priority Data
Dec. 10, 2019 (JP) .............................. JP2019-223301

(51) Int. Cl.
G05D 1/02 (2020.01)
G08G 1/09 (2006.01)
G08G 1/095 (2006.01)

(52) U.S. Cl.
CPC ............. *G08G 1/091* (2013.01); *G08G 1/095* (2013.01)

(58) Field of Classification Search
USPC ....................................................... 340/905
See application file for complete search history.

(56) References Cited

U.S. PATENT DOCUMENTS

| | | | | |
|---|---|---|---|---|
| 2007/0257817 A1* | 11/2007 | Mahoney | .................. | G09F 9/30 340/929 |
| 2013/0093890 A1* | 4/2013 | Cunningham | ......... | B60K 35/00 348/148 |
| 2014/0247160 A1* | 9/2014 | Glascock | ............... | G08G 1/095 340/907 |
| 2015/0379872 A1* | 12/2015 | Al-Qaneei | ....... | G08G 1/096758 340/905 |
| 2018/0173237 A1* | 6/2018 | Reiley | .................. | G05D 1/0061 |

FOREIGN PATENT DOCUMENTS

| JP | H03-235200 A | 10/1991 |
|---|---|---|
| JP | 2017-199317 A | 11/2017 |

* cited by examiner

*Primary Examiner* — Brent Swarthout
(74) *Attorney, Agent, or Firm* — Rankin, Hill & Clark LLP

(57) ABSTRACT

An autonomous driving vehicle information presentation apparatus includes: a traffic signal information obtaining unit that obtains traffic signal information on a traffic light at an intersection ahead of a host vehicle in a direction of advance; a check-recognition unit that recognizes change timing of a traffic signal of the traffic light based on the traffic signal information on the traffic light; and an information presentation unit that presents traffic signal information including an instruction to stop, a warning for advance, or a permission to advance expressed by the traffic signal of the traffic light, with a rear display unit provided at a position at which the rear display unit is visible to an occupant in a trailing vehicle. The information presentation unit presents the traffic signal information further containing the change timing of the traffic signal of the traffic light recognized by the check-recognition unit, with the rear display unit.

4 Claims, 12 Drawing Sheets

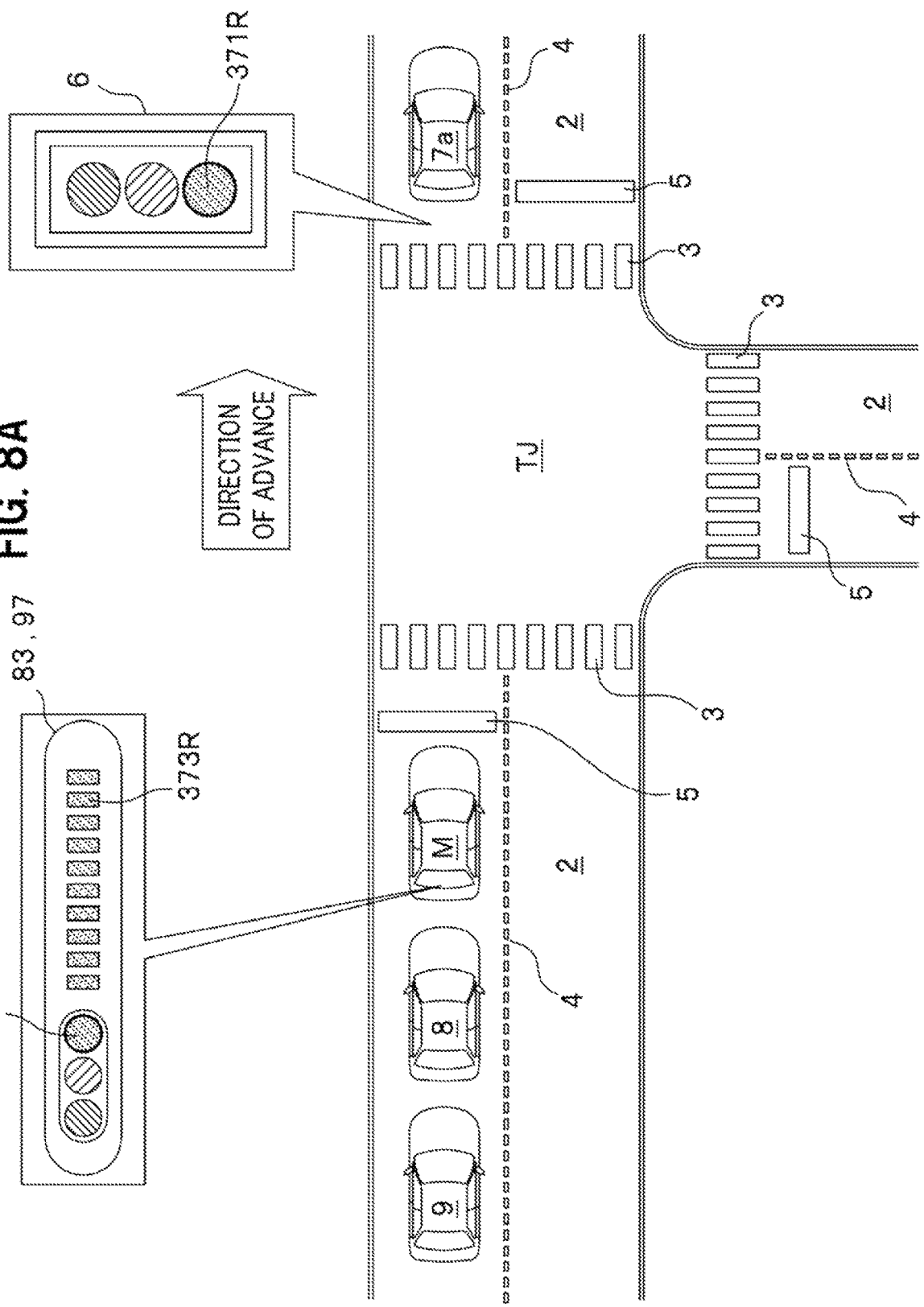

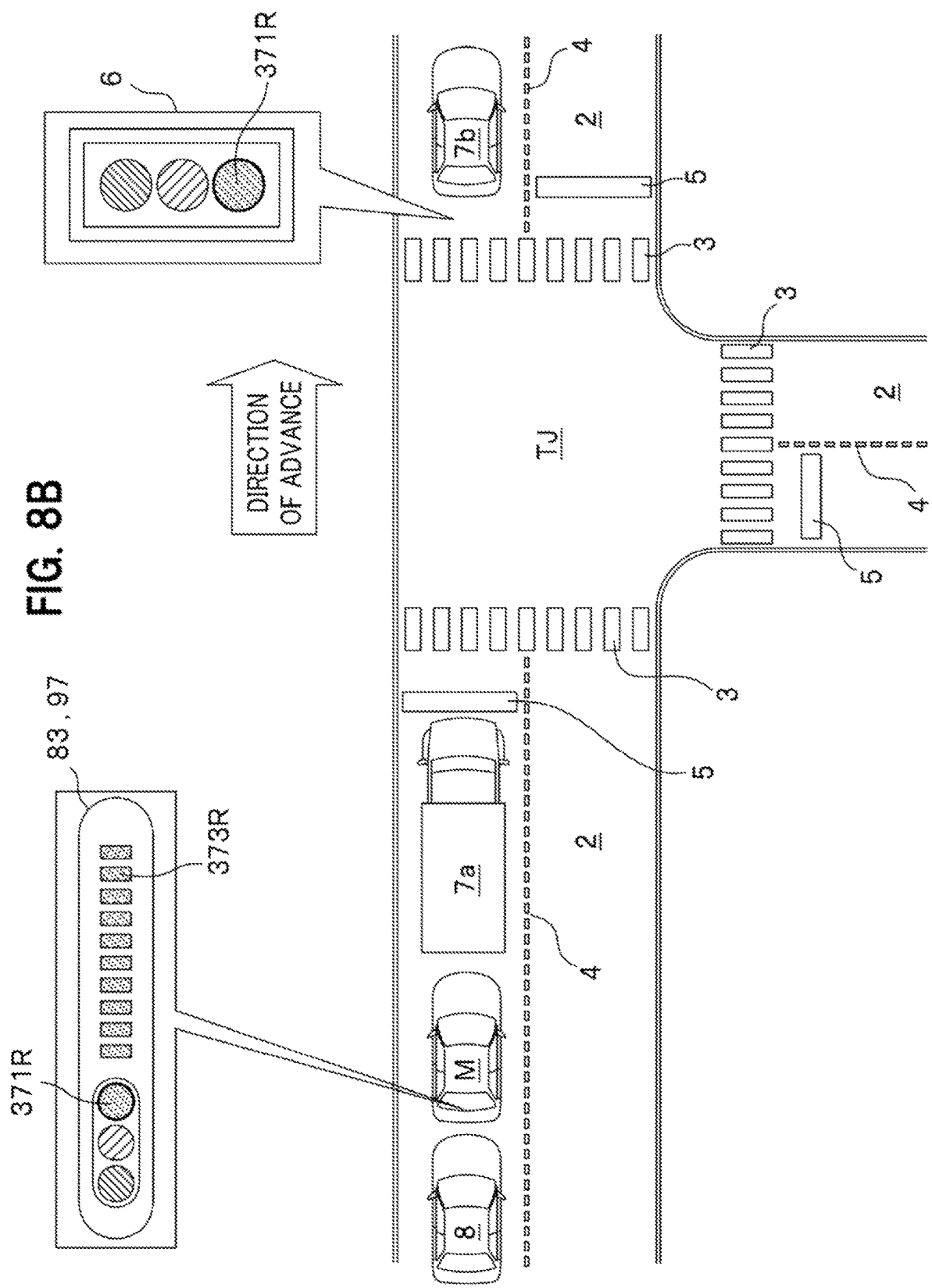

AUTONOMOUS DRIVING VEHICLE INFORMATION PRESENTATION APPARATUS

CROSS-REFERENCE TO RELATED APPLICATION

This application is based upon and claims priority from the Japanese Patent Application No. 2019-223301, filed on Dec. 10, 2019, the entire contents of which are incorporated herein by reference.

BACKGROUND OF THE INVENTION

1. Field of the Invention

The present invention relates to an autonomous driving vehicle information presentation apparatus that presents suitable information from an autonomous driving vehicle to a traffic participant present around the vehicle.

2. Description of the Related Art

Recently, autonomous driving techniques have been vigorously proposed to achieve safe and comfortable driving of a vehicle while reducing the burden on the driver.

The applicant of the present application has disclosed an invention of a vehicle control system as an example of the autonomous driving technique that includes: a detection unit that detects the state of surroundings of a vehicle; an autonomous driving control unit that executes autonomous driving which autonomously controls as least one of the speed and steering of the vehicle based on the state of the surroundings of the vehicle detected by the detection unit; a recognition unit that recognizes the direction of a person from the vehicle based on the state of the surroundings of the vehicle detected by the detection unit; and an output unit that outputs information being recognizable by the person recognized by the recognition unit and having directivity in the direction of the person recognized by the recognition unit (see Japanese Patent Application Publication No. 2017-199317).

In the invention of the vehicle control system according to Japanese Patent Application Publication No. 2017-199317, information is outputted which is recognizable by a person recognized by the recognition unit and has directivity in the direction of the recognized person. This can reduce a sense of unease that the host vehicle may give to a person present around it.

Japanese Patent Application Publication No. Hei 3-235200 discloses an invention of a trailing vehicle traffic signal display apparatus that displays the traffic signal display state of a traffic light present ahead of the host vehicle to a trailing vehicle traveling behind the host vehicle.

In the invention of the trailing vehicle traffic signal display apparatus according to Japanese Patent Application Publication No. Hei 3-235200, the traffic signal display state of a traffic light present ahead of the host vehicle is displayed to the trailing vehicle. This can reliably notify the occupant in the trailing vehicle of the traffic signal display state of the traffic light and reduce a sense of unease that may be felt by the occupant in the trailing vehicle.

SUMMARY OF THE INVENTION

However, even with the inventions according to Japanese Patent Application Publication Nos. 2017-199317 and Hei 3-235200, there is still a possibility that the autonomous driving vehicle may give a sense of unease to traffic participants present around the vehicle.

The present invention has been made in view of the above circumstances and makes it an object thereof to provide an autonomous driving vehicle information presentation apparatus that enables an autonomous driving vehicle to further reduce a sense of unease which the vehicle may give to a traffic participant present around it.

In order to solve the above-described problem, an autonomous driving vehicle information presentation apparatus according to a present invention (1) is an autonomous driving vehicle information presentation apparatus that is used in an autonomous driving vehicle which obtains outside information on an outside including a traffic participant present around a host vehicle, generates an action plan for the host vehicle based on the obtained outside information, and autonomously controls at least one of speed and steering of the host vehicle in accordance with the generated action plan, and that presents information to the traffic participant. A main characteristic feature of the autonomous driving vehicle information presentation apparatus is that it comprises: a traffic signal information obtaining unit that obtains traffic signal information on a traffic light present at an intersection ahead of the host vehicle in a direction of advance, a recognition unit that recognizes change timing of a traffic signal of the traffic light based on the traffic signal information on the traffic light obtained by the traffic signal information obtaining unit; and an information presentation unit that presents traffic signal information including an instruction to stop, a warning for advance, or a permission to advance expressed by the traffic signal of the traffic light, by using an exterior display apparatus provided at a position in a rear portion of a cabin of the host vehicle at which the exterior display apparatus is visible to an occupant in a trailing vehicle, in which wherein the information presentation unit presents the traffic signal information further containing the change timing of the traffic signal of the traffic light recognized by the recognition unit, by using the exterior display apparatus.

According to the present invention, an autonomous driving vehicle can further reduce a sense of unease which the vehicle may give to a traffic participant present around it.

BRIEF DESCRIPTION OF THE DRAWINGS

FIG. 8A is a diagram used to describe operation of the autonomous driving vehicle equipped with the autonomous driving vehicle information presentation apparatus in a first traveling scene.

FIG. 8B is a diagram used to describe operation of the autonomous driving vehicle equipped with the autonomous driving vehicle information presentation apparatus in a second traveling scene.

DETAILED DESCRIPTION OF THE EMBODIMENTS

Figure 1:
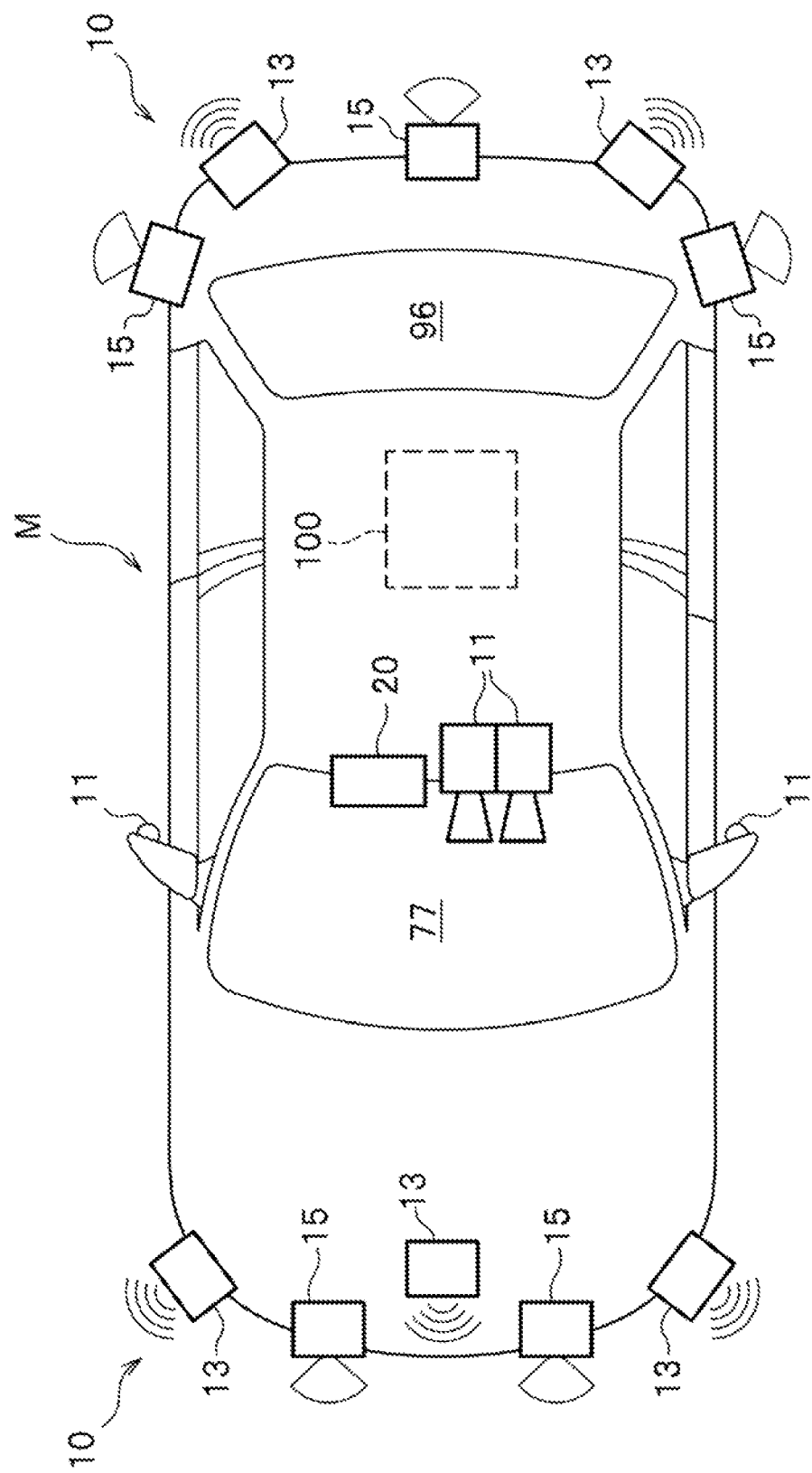
FIG. 1 is an entire configuration diagram of an autonomous driving vehicle including an information presentation apparatus according to an embodiment of the present invention.

Autonomous driving vehicle information presentation apparatuses according to embodiments of the present invention will be hereinafter described in detail with reference to the drawings.

Note that, in the drawings be presented below, members having the same function are denoted by the same reference sign. Moreover, the sizes and shapes of members may be changed or exaggerated and schematically illustrated for convenience of explanation.

When the terms "left" and "right" are used in relation to a host vehicle M in the description of the vehicle control apparatuses according to the embodiments of the present invention, the front side of the host vehicle M in the direction of advance is the reference direction. Specifically, in a case where the host vehicle M is, for example, right-hand drive, the driver's seat side will referred to as the right side, and the passenger's seat side will be referred to as the left side.

[Configuration of Host Vehicle M]

First of all, a configuration of a vehicle including a vehicle control apparatus 100 according to an embodiment of present invention (hereinafter referred to as "host vehicle M") will be described with reference to FIG. 1.

FIG. 1 is an entire configuration diagram of the vehicle including the vehicle control apparatus 100 according to the embodiment of the present invention.

As illustrated in FIG. 1, the host vehicle M equipped with the vehicle control apparatus 100 according to the embodiment of the present invention is an automobile, such as a two-wheeled, three-wheeled, or four-wheeled automobile, for example.

The host vehicle M includes an automobile with an internal combustion engine such as a diesel engine or a gasoline engine as a power source, an electric automobile with an electric motor as a power source, a hybrid automobile with both an internal combustion engine and an electric motor, and the like. Of these, the electric automobile is driven using electric power discharged from a cell such as a secondary cell, a hydrogen fuel cell, a metal fuel cell, or an alcohol fuel cell, for example.

As illustrated in FIG. 1, the host vehicle M is equipped with: an external sensor 10 having a function of detecting outside information on targets including objects and signs present around the host vehicle M; a navigation apparatus 20 having a function of mapping the current position of the host vehicle M onto a map, guiding the host vehicle M to a destination through a route, and so on; and the vehicle control apparatus 100 having a function of controlling self-driving of the host vehicle M including the steering and the acceleration and deceleration of the host vehicle M and so on.

These apparatuses and instruments are configured such that they are connected so as to be capable of communicating data to each other through a communication medium such as a controller area network (CAN), for example.

Note that the "vehicle control apparatus" may include other components (such as the external sensor 10 and an HMI 35) in addition to the components of the "vehicle control apparatus 100" according to this embodiment.

[External Sensor 10]

The external sensor 10 is configured of cameras 11, radars 13, and lidars 15.

The cameras 11 have an optical axis orientated toward the front side of the host vehicle and tilted obliquely downward, and has a function of capturing an image in the direction of advance of the host vehicle M. In an example, complementary metal oxide semiconductor (CMOS) cameras, charge coupled device (CCD) cameras, or the like can be used as the cameras 11 as appropriate. The cameras 11 are provided near the rearview mirror (not illustrated) inside the cabin of the host vehicle M and on a front portion of a right door and a front portion of a left door outside the cabin of the host vehicle M, or the like.

The cameras 11 repetitively capture images of, for example, a front side in the direction of advance, a right rear side, and a left rear side relative to the host vehicle M on a periodic basis. In this embodiment, the camera 11 provided near the rearview mirror is a pair of monocular cameras arranged side by side. The camera 11 may be a stereo camera.

The pieces of image information on the front side in the direction of advance, the right rear side, and the left rear side relative to the host vehicle M captured by the cameras 11 are transmitted to the vehicle control apparatus 100 through the communication medium.

The radars 13 have a function of obtaining distribution information on targets including a leading vehicle being a following target traveling ahead of the host vehicle M by emitting radar waves to the targets and receiving the radar waves reflected by the targets, the distribution information including the distances to the targets and the orientations of the targets. Laser beams, microwaves, millimeter waves, ultrasonic waves, or the like can be used as the radar waves as appropriate.

In this embodiment, five radars 13 are provided, three on the front side and two on the rear side, as illustrated in FIG. 1. The target distribution information obtained by the radars 13 is transmitted to the vehicle control apparatus 100 through the communication medium.

The lidars 15 (Light Detection and Ranging) have a function of detecting the presence of a target and the distance to a target by, for example, measuring the time taken to detect scattered light of emitted light. In this embodiment, five lidars 15 are provided, two on the front side and three on the rear side, as illustrated in FIG. 1. The target distribution information obtained by the lidars 15 is transmitted to the vehicle control apparatus 100 through the communication medium.

[Navigation Apparatus 20]

The navigation apparatus 20 is configured of a global navigation satellite system (GNSS) receiver, map information (navigation map), a touchscreen-type interior display apparatus 61 functioning as a human machine interface, speakers 63 (see FIG. 3 for these two), a microphone, and so on. The navigation apparatus 20 serves to locate the current position of the host vehicle M with the GNSS receiver and also to derive a route from the current position to a destination designated by the user.

The route derived by the navigation apparatus 20 is provided to a target lane determination unit 110 (described later) of the vehicle control apparatus 100. The current position of the host vehicle M may be identified or complemented by an inertial navigation system (INS) utilizing the outputs of a vehicle sensor 30 (see FIG. 2). Also, while the vehicle control apparatus 100 is executing a manual driving mode, the navigation apparatus 20 navigates through a route to a destination by using sound and voice or by displaying a map.

Note that the function of locating the current position of the host vehicle M may be provided independently of the navigation apparatus 20. Also, the navigation apparatus 20 may be implemented by a function of a terminal apparatus such as a smartphone or tablet carried by the user, for example. In this case, information is transmitted and received between the terminal apparatus and the vehicle control apparatus 100 via wireless or wired communication.

[Vehicle Control Apparatus 100 and its Peripheral Components]

Next, the vehicle control apparatus 100 and its peripheral components mounted on the host vehicle M according to an embodiment of the present invention will be described with reference to FIG. 2.

Figure 2:
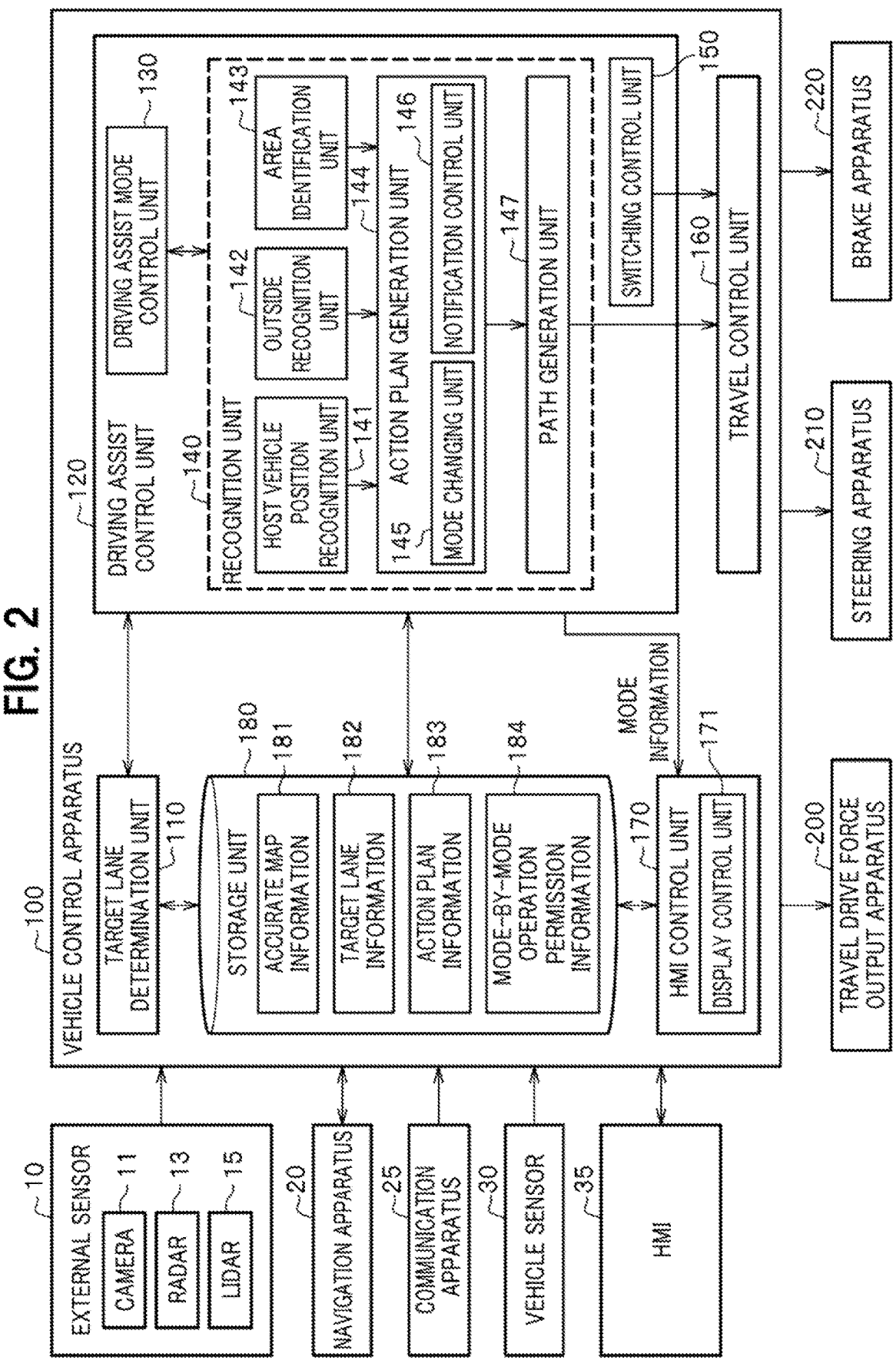
FIG. 2 is a functional block configuration diagram illustrating a vehicle control apparatus including an autonomous driving vehicle information presentation apparatus and its peripheral components according to an embodiment of the present invention.

FIG. 2 is a functional block configuration diagram illustrating the vehicle control apparatus 100 and its peripheral components according to the embodiment of the present invention.

As illustrated in FIG. 2, the host vehicle M is equipped with a communication apparatus 25, the vehicle sensor 30, the HMI 35, a travel drive force output apparatus 200, a steering apparatus 210, and a brake apparatus 220, as well as the above-described external sensor 10, navigation apparatus 20, and vehicle control apparatus 100.

The communication apparatus 25, the vehicle sensor 30, the HMI 35, the travel drive force output apparatus 200, the steering apparatus 210, and the brake apparatus 220 are configured such that they are connected to the vehicle control apparatus 100 so as to be capable of communicating data to and from the vehicle control apparatus 100 through the communication medium.

[Communication Apparatus 25]

The communication apparatus 25 has a function of performing communication through a wireless communication medium such as a cellular network, a Wi-Fi network, Bluetooth (registered trademark), or a dedicated short range communication (DSRC), for example.

The communication apparatus 25 wirelessly communicates with, for example, an information providing server of a system that monitors the traffic situations of roads, such as the Vehicle Information and Communication System (VICS) (registered trademark), and obtains traffic information indicating the traffic situation of the road which the host vehicle M is currently traveling or a road which the host vehicle M will be traveling. The traffic information contains pieces of information such as information on congestion ahead, information on the times required to pass through congested areas, information on accidents, failed vehicles, and construction, information on speed restrictions and lane closures, information on the locations of parking lots, and information on the availability of parking lots and rest areas.

The communication apparatus 25 may obtain the traffic information by, for example, communicating with a radio beacon provided on a side margin of the road or the like or performing vehicle-to-vehicle communication with another vehicle traveling around the host vehicle M.

The communication apparatus 25 also wirelessly communicates with, for example, an information providing server of the Traffic Signal Prediction Systems (TSPS) and obtains traffic signal information on traffic lights provided on the road which the host vehicle M is currently traveling or a road which the host vehicle M will be traveling. The TSPS serves to assist driving to smoothly cross intersections with traffic lights by using the traffic signal information on the traffic lights.

The communication apparatus 25 may obtain the traffic signal information by, for example, communicating with an optical beacon provided on a side margin of the road or the like or performing vehicle-to-vehicle communication with another vehicle traveling around the host vehicle M.

[Vehicle Sensor 30]

The vehicle sensor 30 has a function of detecting various pieces of information on the host vehicle M. The vehicle sensor 30 includes: a vehicle speed sensor that detects the vehicle speed of the host vehicle M; an acceleration sensor that detects the acceleration of the host vehicle M; a yaw rate sensor that detects the angular speed of the host vehicle M about a vertical axis; an orientation sensor that detects the orientation of the host vehicle M; a tilt angle sensor that detects the tilt angle of the host vehicle M; an illuminance sensor that detects the illuminance of the area where the host vehicle M is present; a raindrop sensor that detects the amount of raindrops at the area where the host vehicle M is present; and so on.

[Configuration of HMI 35]

Next, the HMI 35 will be described with reference to FIGS. 3, 4, 5A, and 5B.

Figure 3:
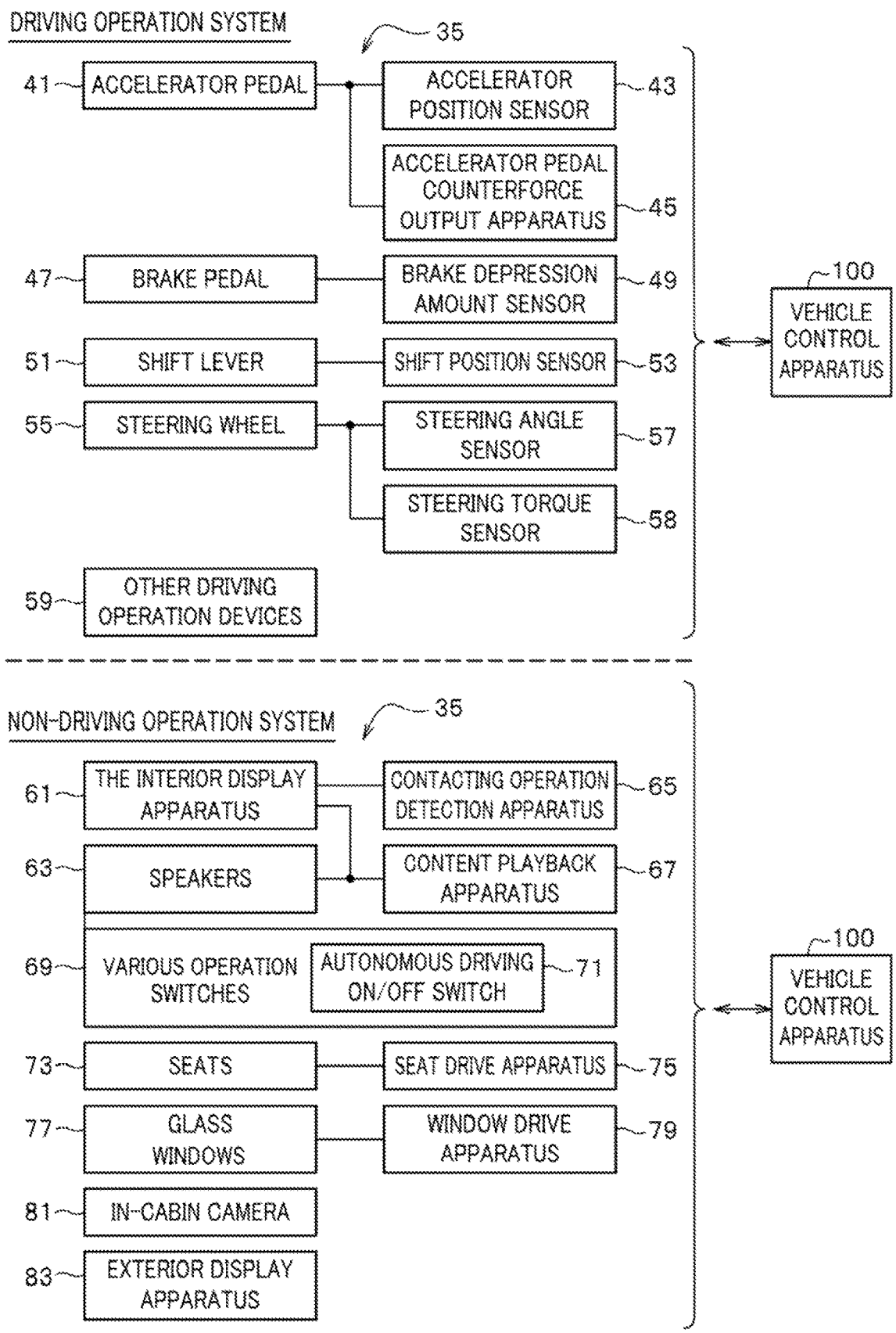
FIG. 3 is a schematic configuration diagram of a human machine interface (HMI) included in the autonomous driving vehicle information presentation apparatus.
Figure 4:
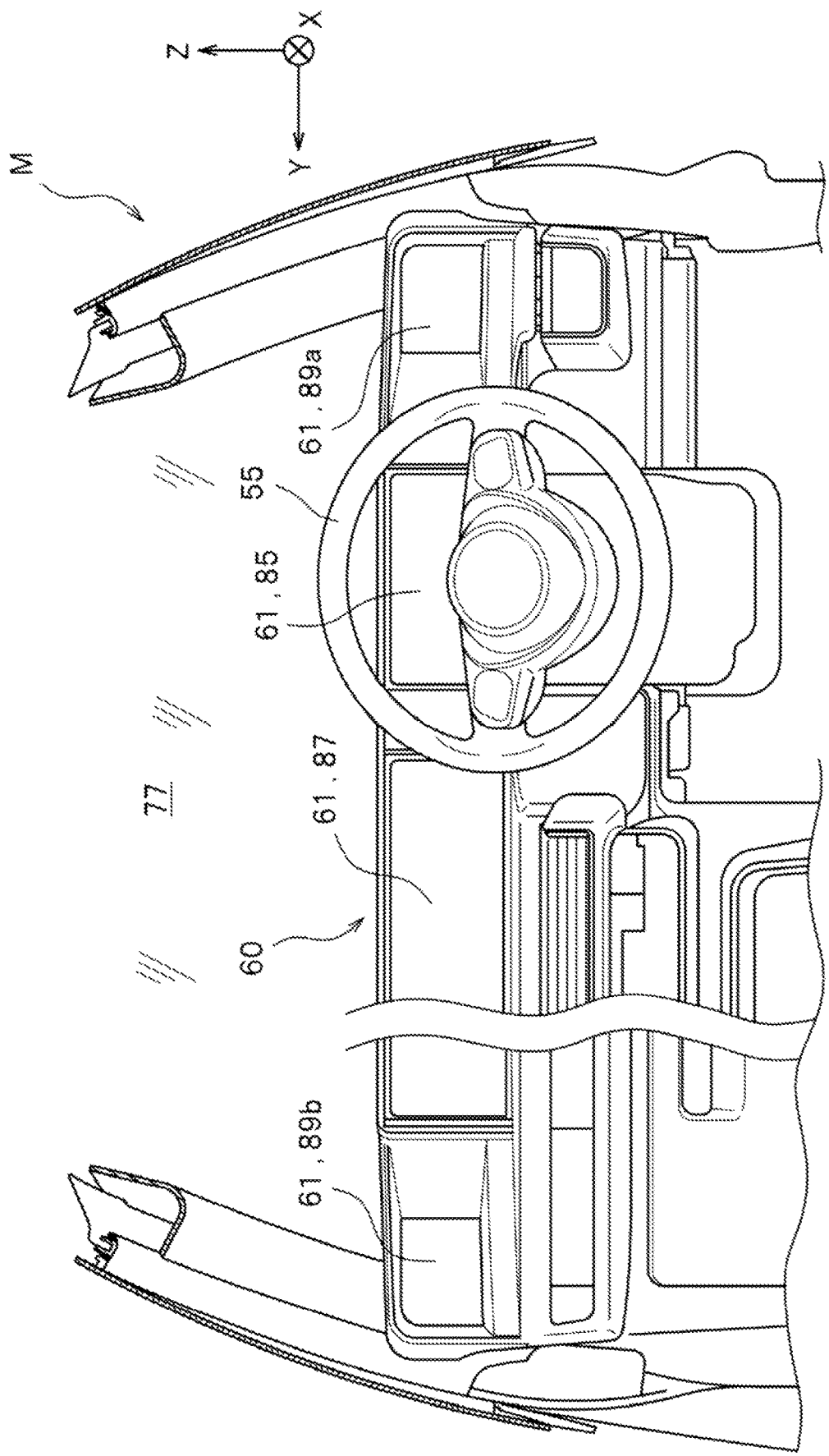
FIG. 4 is a diagram illustrating a front structure of the cabin of the autonomous driving vehicle.
Figure 5A:
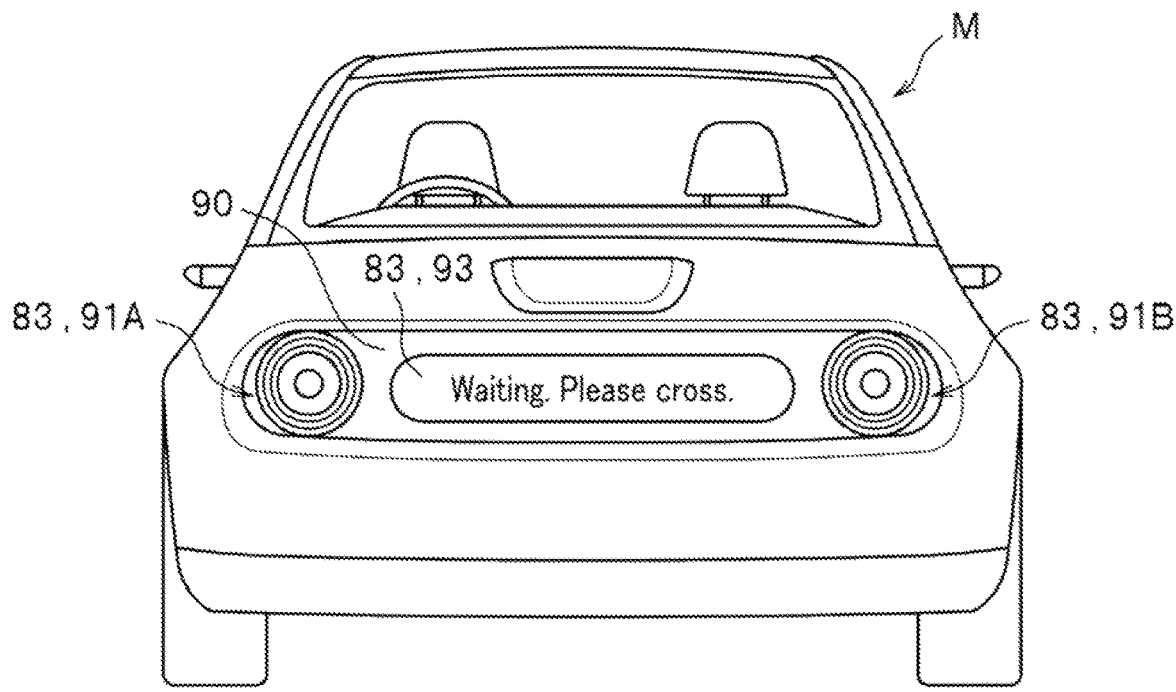
FIG. 5A is an exterior diagram illustrating a front structure of the autonomous driving vehicle.
Figure 5B:
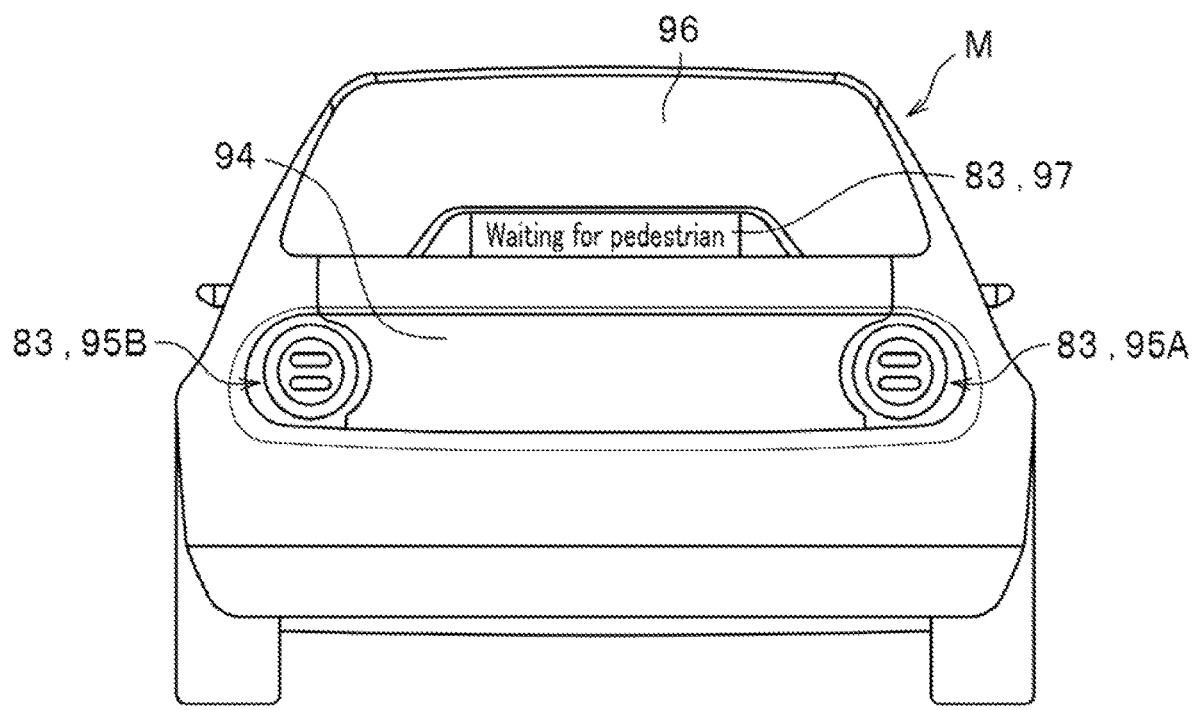
FIG. 5B is an exterior diagram illustrating a rear structure of the autonomous driving vehicle.

FIG. 3 is a schematic configuration diagram of the HMI 35 connected to the vehicle control apparatus 100 according to an embodiment of the present invention. FIG. 4 is a diagram illustrating a front structure of the cabin of the vehicle M including the vehicle control apparatus 100. FIGS. 5A and 5B are exterior diagrams illustrating a front structure and a rear structure of the vehicle M including the vehicle control apparatus 100, respectively.

As illustrated in FIG. 3, the HMI 35 includes constituent members of a driving operation system and constituent members of a non-driving operation system. There is no clear boundary between them, and a configuration in which constituent members of the driving operation system includes functions of the non-driving operation system (or vice versa) may be employed.

As illustrated in FIG. 3, the HMI 35 includes, as the constituent members of the driving operation system: an accelerator pedal 41, an accelerator position sensor 43, and an accelerator pedal counterforce output apparatus 45; a brake pedal 47 and a brake depression amount sensor 49; a shift lever 51 and a shift position sensor 53; a steering wheel 55, a steering angle sensor 57 and a steering torque sensor 58; and other driving operation devices 59.

The accelerator pedal 41 is an acceleration operator that receives an acceleration instruction (or a deceleration instruction with a returning operation) by the driver. The accelerator position sensor 43 detects the amount of depression of the accelerator pedal 41 and outputs an accelerator position signal indicating the amount of the depression to the vehicle control apparatus 100.

Note that a configuration may be employed which, instead of outputting the accelerator position signal to the vehicle control apparatus 100, outputs the accelerator position signal directly to the travel drive force output apparatus 200, the steering apparatus 210, or the brake apparatus 220. This applies also to the other components of the driving operation system to be described below. The accelerator pedal counterforce output apparatus 45 outputs a force (operation counterforce) to the accelerator pedal 41 in the opposite direction from the direction in which the accelerator pedal 41 is operated, for example, in accordance with an instruction from the vehicle control apparatus 100.

The brake pedal 47 is a deceleration operator that receives a deceleration instruction by the driver. The brake depression amount sensor 49 detects the amount of depression of (or the force of depression on) the brake pedal 47, and outputs a brake signal indicating the result of the detection to the vehicle control apparatus 100.

The shift lever 51 is a gearshift operator that receives a shift stage change instruction by the driver. The shift position sensor 53 detects a shift stage designated by the driver and outputs a shift position signal indicating the result of the detection to the vehicle control apparatus 100.

The steering wheel 55 is a steering operator that receives a turn instruction by the driver. The steering angle sensor 57 detects the steering angle of the steering wheel 55, and outputs a steering angle signal indicating the result of the detection to the vehicle control apparatus 100. The steering torque sensor 58 detects torque applied to the steering wheel 55, and outputs a steering torque signal indicating the result of the detection to the vehicle control apparatus 100.

The steering wheel 55 corresponds to a "driving operator" in the present invention.

The other driving operation devices 59 are, for example, a joystick, buttons, a rotary switch, a graphical user interface (GUI) switch, and so on. The other driving operation devices 59 receive an acceleration instruction, a deceleration instruction, a turn instruction, and so on and output them to the vehicle control apparatus 100.

As illustrated in FIG. 3, the HMI 35 includes, as the constituent members of the non-driving operation system: the interior display apparatus 61; the speakers 63; a contacting operation detection apparatus 65 and a content playback apparatus 67; various operation switches 69; seats 73 and a seat drive apparatus 75; glass windows 77 and a window drive apparatus 79; an in-cabin camera 81; and an exterior display apparatus 83, for example.

The interior display apparatus 61 is a display apparatus preferably of a touchscreen type having a function of displaying various pieces of information to the occupants in the cabin. As illustrated in FIG. 4, the interior display apparatus 61 includes, in an instrument panel 60: a meter panel 85 provided at a position directly opposite the driver's seat; a multi-information panel 87 horizontally elongated in the vehicle width direction and provided so as to face the driver's seat, and the passenger's seat; a right panel 89a provided on the driver's seat side in the vehicle width direction; and a left panel 89b provided on the passenger's seat side in the vehicle width direction. Note that the interior display apparatus 61 may be provided additionally at such a position as to face the rear seats (the back side of the rear seats).

The meter panel 85 displays, for example, a speedometer, a tachometer, an odometer, shift position information, on/off information on lights, and so on.

The multi-information panel 87 displays, for example: map information on the area around the host vehicle M; information on the current position of the host vehicle M on the map; traffic information (including traffic signal information) on the road which the host vehicle M is currently traveling or a route which the host vehicle M will be traveling; traffic participant information on traffic participants (including pedestrians, bicycles, motorcycles, other vehicles, and so on) present around the host vehicle M; various pieces of information such as messages to be presented to the traffic participants; and so on.

The right panel 89a displays image information on a right rear side and a right lower side relative to the host vehicle M captured by the camera 11 provided on the right side of the host vehicle M.

The left panel 89b displays image information on a left rear side and a left lower side relative to the host vehicle M captured by the camera 11 provided on the left side of the host vehicle M.

The interior display apparatus 61 is not particularly limited. For example, it is formed of liquid crystal displays (LCDs), organic electroluminescence (EL) displays, or the like. The interior display apparatus 61 may be formed of head-up displays (HUDs) that project necessary images on the glass windows 77.

The speakers 63 have a function of outputting voice and sound. An appropriate number of speakers 63 are provided at appropriate positions inside the cabin such as in the instrument panel 60, the door panels, and the rear parcel shelf (none of which is illustrated), for example.

When the interior display apparatus 61 is of a touchscreen type, the contacting operation detection apparatus 65 has a function of detecting a touched position on any of the display screens of the interior display apparatus 61 and outputting information on the detected touched position to the vehicle control apparatus 100. The contacting operation detection apparatus 65 can omit this function when the interior display apparatus 61 is not of a touchscreen type.

The content playback apparatus 67 includes, for example, a digital versatile disc (DVD) playback apparatus, a compact disc (CD) playback apparatus, a television receiver, a playback apparatus for various guide images, and so on. Some or all of the interior display apparatus 61, the speakers 63, the contacting operation detection apparatus 65, and the content playback apparatus 67 may be components also used by the navigation apparatus 20.

The various operation switches 69 are arranged at appropriate positions inside the cabin. The various operation switches 69 include an autonomous driving ON/OFF switch 71 that issues an instruction to immediately start autonomous driving (or to start autonomous driving in the future) or to stop autonomous driving. The autonomous driving ON/OFF switch 71 may be a GUI switch or a mechanical switch. The various operation switches 69 may also include switches for driving the seat drive apparatus 75 and the window drive apparatus 79.

The seats 73 are seats for the occupants in the host vehicle M to sit on. The seat drive apparatus 75 freely drives the reclining angles, front-rear positions, yaw angles, and the like of the seats 73. The glass windows 77 are provided to all doors, for example. The window drive apparatus 79 drive the glass windows 77 so as to open or close them.

The in-cabin camera 81 is a digital camera utilizing a solid-state imaging element, such as a CCD or a CMOS. The in-cabin camera 81 is provided at such a position as to be capable of capturing an image of at least the head of the driver sitting on the driver's seat, such as in the rearview mirror, the steering boss (neither of which is illustrated), or the instrument panel 60. In an example, the in-cabin camera 81 repetitively captures an image of the inside of the cabin including the driver on a periodic basis, for example.

The exterior display apparatus 83 has a function of displaying various pieces of information to traffic participants present around the host vehicle M (including pedestrians, bicycles, motorcycles, other vehicles, and so on). As illustrated in FIG. 5A, the exterior display apparatus 93 includes, in a front grill 90 of the host vehicle M, a right front light unit 91A and a left front light unit 91B provided separated from each other in the vehicle width direction, and a front display unit 93 provided between the left and right front light units 91A and 91B.

As illustrated in FIG. 5B, the exterior display apparatus 83 also includes, in a rear grill 94 of the host vehicle M, a right rear light unit 95A and a left rear light unit 95B provided separated from each other in the vehicle width direction, and a rear display unit 97 provided at a position inside the cabin of the host vehicle M at which the rear display unit 97 is visible from outside through a center lower portion of a rear window 96. The rear display unit 97 is provided, for example, at the lower end of an opening for the rear window 96 (not illustrated) or the like.

Figure 5C:
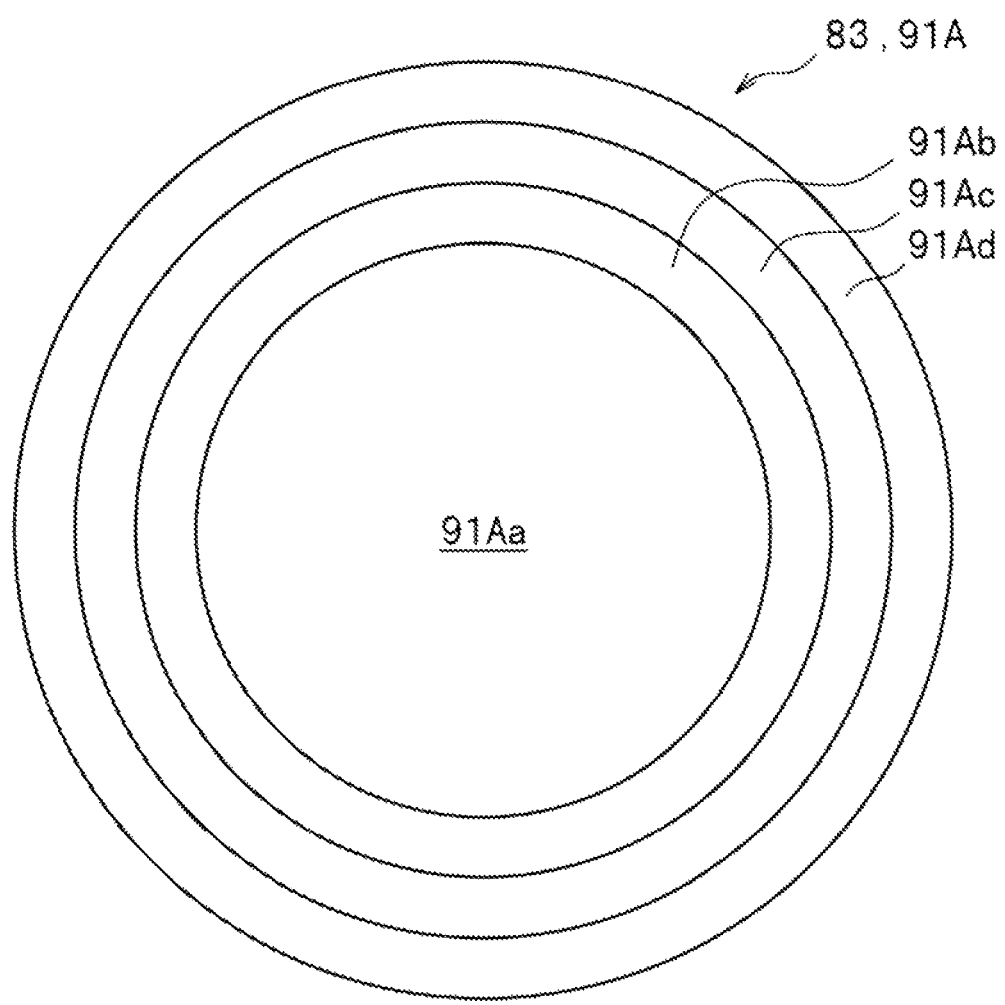
FIG. 5C is a front view illustrating a schematic configuration of a right front light unit included in the autonomous driving vehicle.

Here, the configurations of the left and right front light units 91A and 91B of the exterior display apparatus 83 will now be described with reference to FIG. 5C. FIG. 5C is a front view illustrating a schematic configuration of the right front light unit 91A included in the host vehicle M. Note that the left and right front light units 91A and 91B have the same configuration. Thus, the schematic configuration of the right front light unit 91A will be described as a description of the configurations of the left and right front light units 91A and 91B.

The right front light unit 91A is formed in a circular shape in a front view. The right front light unit 91A is configured such that a turn signal 91Ab, a light display part 91Ac, and a position lamp 91Ad each formed in an annular shape are arranged concentrically in this order toward the radially outer side and centered around a headlamp 91Aa formed in a circular shape in a front view having a smaller diameter than the outer diameter of the right front light unit 91A.

The headlamp 91Aa serves to assist the occupant to view ahead while the host vehicle M is traveling through a dark area by illuminating the front side in the direction of advance with light. The turn signal 91Ab serves to notify traffic participants present around the host vehicle M of an intention to turn left or right when the host vehicle M does so. The light display part 91Ac serves to notify traffic participants present around the host vehicle M of traveling intention of the host vehicle M including stopping (this will be described later in detail) along with a content displayed on the front display unit 93. The position lamp 91Ad serves to notify traffic participants present around the host vehicle M of its vehicle width while the host vehicle M is traveling through a dark area.

[Configuration of Vehicle Control Apparatus 100]

Next, referring back to FIG. 2, a configuration of the vehicle control apparatus 100 will be described.

The vehicle control apparatus 100 is implemented by, for example, at least one processor or hardware having an equivalent function. The vehicle control apparatus 100 may be configured of a combination of electronic control units (ECUs), micro-processing units (MPUs), or the like in each of which a processor such as a central processing unit (CPU), a storage apparatus, and a communication interface are connected by an internal bus.

The vehicle control apparatus 100 includes the target lane determination unit 110, a driving assist control unit 120, a travel control unit 160, an HMI control unit 170, and a storage unit 180.

The functions of the target lane determination unit 110 and the driving assist control unit 120 and part or entirety of the function of the travel control unit 160 are implemented by the processor executing programs (software). Also, some or all of these functions may be implemented by hardware such as a large scale integration (LSI) circuit or an application specific integrated circuit (ASIC) or be implemented by a combination of software and hardware.

In the following description, when a subject is mentioned like "~unit does . . . ", the driving assist control unit 120 reads out the corresponding program from a read only memory (ROM) or an electrically erasable programmable read-only memory (EEPROM) as necessary, loads it into a random access memory (RAM), and executes the corresponding function (described later). The program may be prestored in the storage unit 180, or taken into the vehicle control apparatus 100 from another storage medium or through a communication medium as necessary.

[Target Lane Determination Unit 110]

The target lane determination unit 110 is implemented by a micro processing unit (MPU), for example. The target lane determination unit 110 divides a route provided from the navigation apparatus 20 into a plurality of blocks (for example, divides the route at 100 [m]-intervals in the direction of advance of the vehicle), and determines a target lane in each block by referring to accurate map information 181. For example, the target lane determination unit 110 determines which lane from the left to travel. When, for example, a branching point, a merging point, or the like is present on the route, the target lane determination unit 110 determines the target lane such that the host vehicle M will be able to travel a rational traveling route for advancing to the target branched path. The target lane determined by the target lane determination unit 110 is stored in the storage unit 180 as target lane information 182.

[Driving Assist Control Unit 120]

The driving assist control unit 120 includes a driving assist mode control unit 130, a recognition unit 140, and a switching control unit 150.

<Driving Assist Mode Control Unit 130>

The driving assist mode control unit 130 determines an autonomous driving mode (autonomous driving assisting state) to be executed by the driving assist control unit 120 based on an operation of the HMI 35 by the driver, an event determined by an action plan generation unit 144, how the host vehicle M should travel determined by a path generation unit 147, and so on. The HMI control unit 170 is notified of the autonomous driving mode.

Each autonomous driving mode can be switched (overridden) to a lower-level autonomous driving mode by an operation of a constituent element of the driving operation system in the HMI 35.

The override is initiated, for example, when a constituent element of the driving operation system in the HMI 35 by the driver of the host vehicle M continues to be operated for longer than a predetermined time, when a predetermined amount of change in operation (e.g., the accelerator position of the accelerator pedal 41, the brake depression amount of the brake pedal 47, or the steering angle of the steering wheel 55) is exceeded, when a constituent element of the driving operation system is operated more than a predetermined number of times, or the like.

<Recognition Unit 140>

The recognition unit 140 includes a host vehicle position recognition unit 141, an outside recognition unit 142, an area identification unit 143, the action plan generation unit 144, and the path generation unit 147.

<Host Vehicle Position Recognition Unit 141>

The host vehicle position recognition unit 141 recognizes the traveling lane which the host vehicle M is currently traveling and the position of the host vehicle M relative to the traveling lane, based on the accurate map information 181 stored in the storage unit 180 and information inputted from the cameras 11, the radars 13, the lidars 15, the navigation apparatus 20, or the vehicle sensor 30.

The host vehicle position recognition unit 141 recognizes the traveling lane by comparing the pattern of road section lines recognized from the accurate map information 181 (e.g., the arrangement of continuous lines and broken lines) and the pattern of the road section lines around the host vehicle M recognized from images captured by the cameras 11. In this recognition, the current position of the host vehicle M obtained from the navigation apparatus 20 and the result of processing by the INS may be taken into account.

<Outside Recognition Unit 142>

As illustrated in FIG. 2, the outside recognition unit 142 recognizes an outside situation including, for example, the positions, vehicle speeds, and accelerations of nearby vehicles based on the information on the outside inputted from the external sensor 10 including the cameras 11, the radars 13, and the lidars 15. The nearby vehicles refer to, for example, other vehicles traveling around the host vehicle M in the same direction as the host vehicle M (a leading vehicle and a trailing vehicle; details will be described later).

The positions of the nearby vehicles may be represented as the centers of gravity of these other vehicles or representative points such as corners, or represented as areas expressed by the contours of the other vehicles. The states of the nearby vehicles may include the speeds and accelerations of the nearby vehicles and whether the nearby vehicles are changing lanes (or whether they are about to change lanes) which are figured out based on information from the above-mentioned various instruments. Alternatively, the outside recognition unit 142 may employ a configuration that recognizes the positions of targets including guard rails, utility poles, parked vehicles, pedestrians, and traffic signs, as well as the nearby vehicles including the leading vehicle and the trailing vehicle.

In embodiments of the present invention, of the nearby vehicles, the vehicle that is traveling immediately ahead of the host vehicle M in the same traveling lane as that of the host vehicle M and is a following target in following travel control will be referred to as "leading vehicle". Also, of the nearby vehicles, the vehicle that is traveling immediately behind the host vehicle M in the same traveling lane as that of the host vehicle H will be referred to as "trailing vehicle".

<Area Identification Unit 143>

The area identification unit 143 obtains information on specific areas present around the host vehicle M (interchanges: ICs, junctions: JCTs, and points where the number of lanes increases or decreases) based on map information. In this way, the area identification unit 143 can obtain information on specific areas that assist the host vehicle M to travel smoothly even if the host vehicle M is hidden behind vehicles ahead including the leading vehicle and cannot capture an image in the direction of advance with the external sensor 10.

Instead of obtaining the information on specific areas based on the map information, the area identification unit 143 may obtain the information on the specific areas by identifying targets with image processing based on an image in the direction of advance captured with the external sensor 10 or by recognizing targets based on the contours in an image in the direction of advance with internal processing by the outside recognition unit 142.

Also, a configuration may be employed which, as will be described later, uses the VICS information obtained by the communication apparatus 25 to enhance the accuracy of the information on the specific areas obtained by the area identification unit 143.

<Action Plan Generation Unit 144>

The action plan generation unit 144 sets the start point of autonomous driving and/or the destination point of the autonomous driving. The start point of the autonomous driving may be the current position of the host vehicle M or a geographical point at which an operation is performed as an instruction to perform the autonomous driving. The action plan generation unit 144 generates an action plan in the zone from this start point to the destination point of the autonomous driving. Note that the action plan is not limited to the above, and the action plan generation unit 144 may generate action plans for any zones.

The action plan is formed of a plurality of events to be executed in turn, for example. Examples of the plurality of events include: a deceleration event in which the host vehicle M is caused to decelerate; an acceleration event in which the host, vehicle M is caused to accelerate; a lane keep event in which the host vehicle M is caused to travel so as not to depart from its traveling lane; a lane change event in which the host vehicle M is caused to change its traveling lane; a passing event in which the host, vehicle M is caused to pass the leading vehicle; a branching event in which the host vehicle M is caused to change to the desired lane at a branching point or to travel so as not to depart from the current traveling lane; a merge event in which the host vehicle M is in a merging lane for merging into a main lane and is caused to accelerate or decelerate and change its traveling lane; a handover event in which the host vehicle M is caused to transition from the manual driving mode to an autonomous driving mode (autonomous driving assisting state) at the start point of the autonomous driving or transition from the autonomous driving mode to the manual driving mode at the scheduled end point of the autonomous driving; and so on.

The action plan generation unit 144 sets a lane change event, a branching event, or a merge event at each point where the target lane determined by the target lane determination unit 110 changes. Information indicating the action plan generated by the action plan generation unit 144 is stored in the storage unit 180 as action plan information 183.

The action plan generation unit 144 includes a mode changing unit 145 and a notification control unit 146.

<Mode Changing Unit 145>

Based, for example, on the result of recognition of the targets present in the direction of advance of the host vehicle M by the outside recognition unit 142, the mode changing unit 145 selects a driving mode suitable for the recognition result from among driving modes including a plurality of preset levels of autonomous driving modes and the manual driving mode, and causes the host vehicle M to perform autonomous driving using the selected driving mode.

<Notification Control Unit 146>

When the mode changing unit 145 changes the driving mode of the host vehicle M, the notification control unit 146 issues a notice indicating the driving mode of the host vehicle M has been changed. The notification control unit 146, for example, causes the speakers 63 to output audio information prestored in the storage unit 180 to issue a notice indicating that the driving mode of the host vehicle M has been changed.

Note that the notice is not limited to an audio notice. The notice may be issued in the form of a display, emitted light, a vibration, or a combination of these as long as it can notify the driver of the change in the driving mode of the host vehicle M.

<Path Generation Unit 147>

The path generation unit 147 generates a path which the host vehicle M should travel, based on the action plan generated by the action plan generation unit 144.

<Switching Control Unit 150>

As illustrated in FIG. 2, the switching control unit 150 switches the driving mode between an autonomous driving mode and the manual driving mode based on a signal inputted from the autonomous driving ON/OFF switch 71 (see FIG. 3) and so on. Also, based on an operation of a constituent element of the driving operation system in the HMI 35 performed as an accelerating, decelerating, or steering instruction, the switching control unit 150 switches the current autonomous driving mode to a lower-level driving mode. For example, if a state where an operation amount indicated by a signal inputted from a constituent element of the driving operation system in the HMI 35 is above a threshold value continues for a reference time or longer, the switching control unit 150 switches (overrides) the current autonomous driving mode to a lower-level driving mode.

Also, the switching control unit 150 may perform switching control that brings the driving mode back to the original autonomous driving mode if detecting no operation on any constituent elements of the driving operation system in the HMI 35 for a predetermined time after the switching to the lower-level driving mode by the override.

<Travel Control Unit 160>

The travel control unit 160 controls travel of the host vehicle M by controlling the travel drive force output apparatus 200, the steering apparatus 210, and the brake apparatus 220 such that the host vehicle M will pass through the path generated by the path generation unit 147, which the host vehicle M should travel, on the scheduled time.

<HMI Control Unit 170>

When notified of setting information on the autonomous driving mode of the host vehicle M by the driving assist control unit 120, the HMI control unit 170 refers to mode-by-mode operation permission information 134 and controls the HMI 35 according to contents set for the autonomous driving mode.

As illustrated in FIG. 2, based on the information on the driving mode of the host vehicle M obtained from the driving assist control unit 120 and by referring to the mode-by-mode operation permission information 184, the HMI control unit 170 determines the apparatuses permitted to be used (the navigation apparatus 20 and part or entirety of the HMI 35) and the apparatuses not permitted to be used. Also, based on the result of the above determination, the HMI control unit 170 controls whether to accept the driver's operations of the driving operation system in the HMI 35 and the navigation apparatus 20.

For example, when the driving mode executed by the vehicle control apparatus 100 is the manual driving mode, the HMI control unit 170 accepts the driver's operations of the driving operation system in the HMI 35 (e.g., the accelerator pedal 41, the brake pedal 47, the shift lever 51, the steering wheel 55, and so on; see FIG. 3).

The HMI control unit 170 includes a display control unit 171.

<Display Control Unit 171>

The display control unit 171 controls displays on the interior display apparatus 61 and the exterior display apparatus 83. Specifically, for example, when the driving mode executed by the vehicle control apparatus 100 is an autonomous driving mode with a high degree of autonomy, the display control unit 171 performs control that causes the interior display apparatus 61 and/or the exterior display apparatus 83 to display information such as a reminder, warning, or driving assistance to traffic participants present around the host vehicle M. This will be described later in detail.

<Storage Unit 180>

The storage unit 180 stores pieces of information such as the accurate map information 181, the target lane information 182, the action plan information 183, and the mode-by-mode operation permission information 184, for example. The storage unit 180 is implemented with a ROM, a RAM, a hard disk drive (HDD), a flash memory, or the like. The programs to be executed by the processor may be prestored in the storage unit 180 or downloaded from an external apparatus via in-vehicle Internet equipment, or the like. Alternatively, the programs may be installed into the storage unit 180 by connecting a mobile storage medium storing the programs to a drive apparatus not illustrated.

The accurate map information 181 is map information that is more accurate than the normal map information included in the navigation apparatus 20. The accurate map information 181 contains, for example, information on the centers of lanes, information on the boundaries of the lanes, and so on. The boundaries of the lanes include the types, colors, and lengths of lane marks, the widths of roads, the widths of shoulders, the widths of main lanes, the widths of lanes, the positions of boundaries, the types of boundaries (guard rail, plant, and curb), hatched zones, and so on, and these boundaries are contained in an accurate map.

The accurate map information 181 may also contain road information, traffic regulation information, address information (addresses and postal codes), facility information, telephone number information, and so on. The road information contains information indicating the types of roads such as expressways, tollways, national highways, and prefectural roads, and information on the number of lanes in each road, the width of each lane, the gradient of the road, the position of the road (three-dimensional coordinates including the longitude, latitude, and height), the curvature of the lane, the positions of merging or branching points on the lane, the signs provided on the road, and so on. The traffic regulation information contains information such as the occurrence of lane closures due to construction, traffic accident, congestion, or the like.

[Travel Drive Force Output Apparatus 200, Steering Apparatus 210, and Brake Apparatus 220]

As illustrated in FIG. 2, the vehicle control apparatus 100 controls the drive of the travel drive force output apparatus 200, the steering apparatus 210, and the brake apparatus 220 in accordance with a travel control instruction from the travel control unit 160.

<Travel Drive Force Output Apparatus 200>

The travel drive force output apparatus 200 outputs drive force (torque) for causing the host vehicle M to travel to its drive wheels. When the host vehicle M is an automobile with an internal combustion engine as a power source, the travel drive force output apparatus 200 includes, for example, the internal combustion engine, a transmission, and an engine electronic control unit (ECU) that controls the internal combustion engine (none of which is illustrated).

Alternatively, when the host vehicle M is an electric automobile with an electric motor as a power source, the travel drive force output apparatus 200 includes a motor for traveling and a motor ECU that controls the motor for traveling (neither of which is illustrated).

Still alternatively, when the host vehicle M is a hybrid automobile, the travel drive force output apparatus 200 includes an internal combustion engine, a transmission, an engine ECU, a motor for traveling, and a motor ECU (none of which is illustrated).

When the travel drive force output apparatus 200 includes only an internal combustion engine, the engine ECU adjusts the throttle opening degree of the internal combustion engine, the shift stage, and so on in accordance with later-described information inputted from the travel control unit 160.

When the travel drive force output apparatus 200 includes only a motor for traveling, the motor ECU adjusts the duty ratio of a PWM signal to be applied to the motor for traveling in accordance with information inputted from the travel control unit 160.

When the travel drive force output apparatus 200 includes an internal combustion engine and a motor for traveling, the engine ECU and the motor ECU cooperate with each other to control the travel drive force in accordance with information inputted from the travel control unit 160.

<Steering Apparatus 210>

The steering apparatus 210 includes, for example, a steering ECU and an electric motor (neither of which is illustrated). The electric motor changes the direction of the turning wheels by exerting force on a rack-and-pinion mechanism, for example. The steering ECU drives the electric motor in accordance with information inputted from the vehicle control apparatus 100 or steering angle or steering torque information inputted, to thereby change the direction of the turning wheels.

<Brake Apparatus 220>

The brake apparatus 220 is, for example, an electric servo brake apparatus including a brake caliper, a cylinder that transfers hydraulic pressure to the brake caliper, an electric motor that generates the hydraulic pressure in the cylinder, and a braking control unit (none of which is illustrated). The braking control unit of the electric servo brake apparatus controls the electric motor in accordance with information inputted from the travel control unit 160 to output a brake torque corresponding to a braking operation to each wheel. The electric servo brake apparatus may include a mechanism, as a backup, that transfers hydraulic pressure generated by operating the brake pedal 47 to the cylinder through a master cylinder.

Note that the brake apparatus 220 is not limited to the above-described electric servo brake apparatus, and may be an electronically controlled hydraulic brake apparatus. The electronically controlled hydraulic brake apparatus controls an actuator in accordance with information inputted from the travel control unit 160 to transfer hydraulic pressure in a master cylinder to a cylinder. Also, the brake apparatus 220 may include a regenerative brake using a motor for traveling that can be included in the travel drive force output apparatus 200.

[Block Configuration of Autonomous Driving Vehicle Information Presentation Apparatus 300]

Next, a block configuration of an autonomous driving vehicle information presentation apparatus 300 according to an embodiment of the present invention included in the above-described vehicle control apparatus 100 will be described with reference to FIG. 6.

Figure 6:
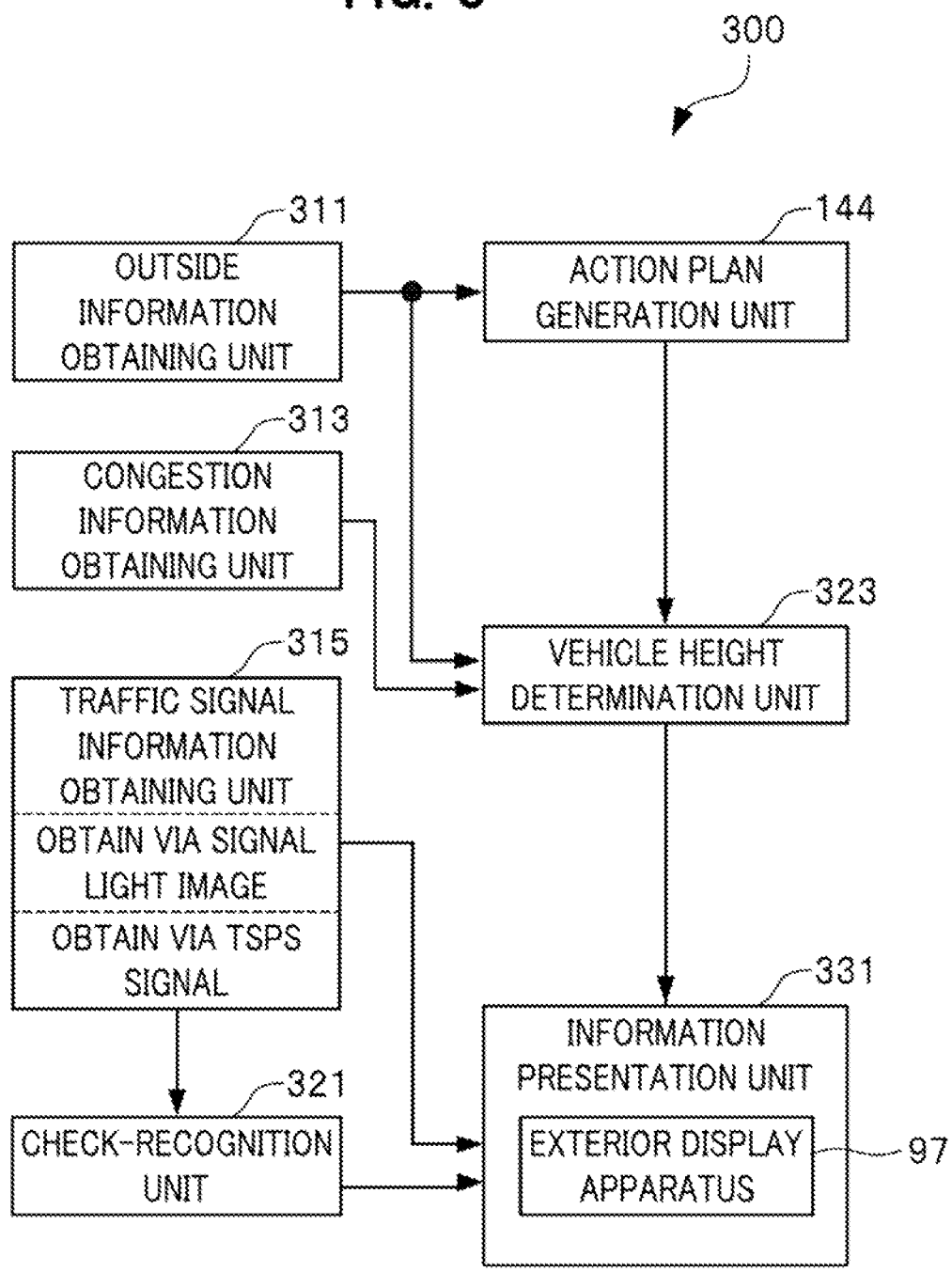
FIG. 6 is a block configuration diagram conceptually illustrating functions of the autonomous driving vehicle information presentation apparatus.

FIG. 6 is a block configuration diagram conceptually illustrating functions of the autonomous driving vehicle information presentation apparatus 300 according to the embodiment of the present invention.

As illustrated in FIG. 6, the autonomous driving vehicle information presentation apparatus 300 according to the embodiment of the present invention is configured of an outside information obtaining unit 311, a congestion information obtaining unit 313, a traffic signal information obtaining unit 315, the action plan generation unit 144 (see FIG. 2 and the corresponding portion describing it for details), a check-recognition unit 321, a vehicle height determination unit. 323, and an information presentation unit 331.

<Outside Information Obtaining Unit 311>

As illustrated in FIG. 6, the outside information obtaining unit 311 has a function of obtaining outside information containing the traveling state of leading vehicle 7a detected by the external sensor 10 (see FIG. 2) and present ahead of the host vehicle M in the direction of advance (see FIG. 8A, for example) and the traveling states of trailing vehicles 8 and 9 detected by the external sensor 10 and present behind the host vehicle M in the direction of advance (see FIG. 8A, for example). The outside information obtaining unit 311 is a functional member corresponding to the recognition unit 140 of the vehicle control apparatus 100 illustrated in FIG. 2.

Note that the channel for the outside information obtaining unit 311 to obtain the outside information is not limited to the external sensor 10. For example, the navigation apparatus 20 and the communication apparatus 25 may be employed.

<Congestion Information Obtaining Unit 313>

As illustrated in FIG. 6, the congestion information obtaining unit 313 has a function of obtaining congestion information on congestion ahead of the host vehicle M in the direction of advance. The congestion information obtaining unit 313 is a functional member corresponding to the recognition unit 140 of the vehicle control apparatus 100 illustrated in FIG. 2.

Note that the channel for the congestion information obtaining unit 313 to obtain the congestion information is not particularly limited. For example, the congestion information obtaining unit 313 may employ a configuration that obtains the congestion information based on VICS traffic information obtained via the communication apparatus 25 or traffic information obtained via road-to-vehicle communication or vehicle-to-vehicle communication using the communication apparatus 25.

<Traffic Signal Information Obtaining Unit 315>

As illustrated in FIG. 6, the traffic signal information obtaining unit 315 has a function of obtaining traffic signal information on a traffic light 6 present at an intersection TJ ahead of the host vehicle M in the direction of advance (see FIG. 8A, for example). The traffic signal information obtaining unit 315 is a functional member corresponding to the recognition unit 140 of the vehicle control apparatus 100 illustrated in FIG. 2.

Note that the following two obtaining channels can be employed as channels for the traffic signal information obtaining unit 315 to obtain the traffic signal information. Specifically, these two channels include: a first channel for obtaining traffic signal information by image processing of a signal light image of the traffic light 6; and a second channel for obtaining traffic signal information by signal decoding of a TSPS signal obtained via the communication apparatus 25. Instead of or in addition to the latter second channel, a third channel may be employed through which traffic signal information is obtained by signal decoding of a traffic signal obtained via road-to-vehicle communication or vehicle-to-vehicle communication using the communication apparatus 25.

<Check-Recognition Unit 321>

As illustrated in FIG. 6, the check-recognition unit 321 basically has a function of recognizing the change timing of the traffic signal of the traffic light 6 based on the pieces of traffic signal information on the traffic light 6 obtained by the traffic signal information obtaining unit 315 through the above-described two obtaining channels (first and second channels).

Also, the check-recognition unit 321 checks the pieces of traffic signal information obtained through the two obtaining channels (first and second channels) against each other and, if the result of the check indicates that the change timings of the traffic signal obtained through the two obtaining channels do not match each other, the check-recognition unit 321 handles the traffic signal information obtained via the signal light image of the traffic light 6 (obtained through the first channel) with priority over the traffic signal information obtained via the TSPS signal (obtained through the second channel).

Here, when the change timings of the traffic signal obtained through the two obtaining channels do not match each other represents, for example, a case where the signal light color based on the traffic signal information obtained via the TSPS signal (obtained through the second channel) is red whereas the signal light color based on the traffic signal information obtained via the signal light image of the traffic light 6 (obtained through the first channel) is green.

Also, that the check-recognition unit 321 handles the traffic signal information obtained through the first channel with priority over the traffic signal information obtained through the second channel means that the traffic signal information obtained through the first channel (the traffic signal actually presented in the signal light color displayed) is assumed to be more reliable than the traffic signal information obtained through the second channel and is used as the main target to be presented as information.

The check-recognition unit 321 is a functional member corresponding to the recognition unit 140 of the vehicle control apparatus 100 illustrated in FIG. 2.

<Vehicle Height Determination Unit 323>

As illustrated in FIG. 6, the vehicle height determination unit 323 has a function of determining whether a vehicle height VH of the leading vehicle 7a (see FIG. 8B, for example) present ahead of the host vehicle M in the direction of advance is greater than a predetermined vehicle height threshold value VHth based on the outside information obtained by the outside information obtaining unit 311. The predetermined vehicle height threshold value VHth is set as appropriate at such a height that it is difficult for the occupants in trailing vehicles traveling immediately behind the leading vehicle 7a (the host vehicle M and the trailing vehicle 8 behind it in the example of FIG. 8B) to see the signal light of the traffic light 6.

The traffic signal information obtaining unit 315 is a functional member corresponding to the recognition unit 140 of the vehicle control apparatus 100 illustrated in FIG. 2.

<Information Presentation Unit 331>

As illustrated in FIG. 6, the information presentation unit 331 is configured of the rear display unit 57 (see FIG. 8A, for example) as the exterior display apparatus 83 illustrated in FIG. 3. The rear display unit 97 is provided at a position in a rear portion of the cabin of the host vehicle M where the rear display unit 97 is visible to the occupants in the trailing vehicles 8 and 9 (see FIG. 8A, for example) and, preferably, easily visible to the drivers.

The information presentation unit 331 has a function of presenting signal light information and information on the change timing of the traffic signal by using the rear display unit 97, the signal light information including an instruction to stop (red), a warning for advance (yellow), and a permission to advance (green) expressed by the color in which the signal light of the traffic light 6 present ahead of the host vehicle M in the direction of advance is turned on. The information presentation unit 331 is a functional member corresponding to the HMI control unit 170 of the vehicle control apparatus 100 illustrated in FIG. 2. The function of the information presentation unit 331 will be described later in detail.

[Operation of Autonomous Driving Vehicle Information Presentation Apparatus 300]

Next, the operation of the autonomous driving vehicle information presentation apparatus 300 according to an embodiment of the present invention will be described with reference to FIG. 7.

Figure 7:
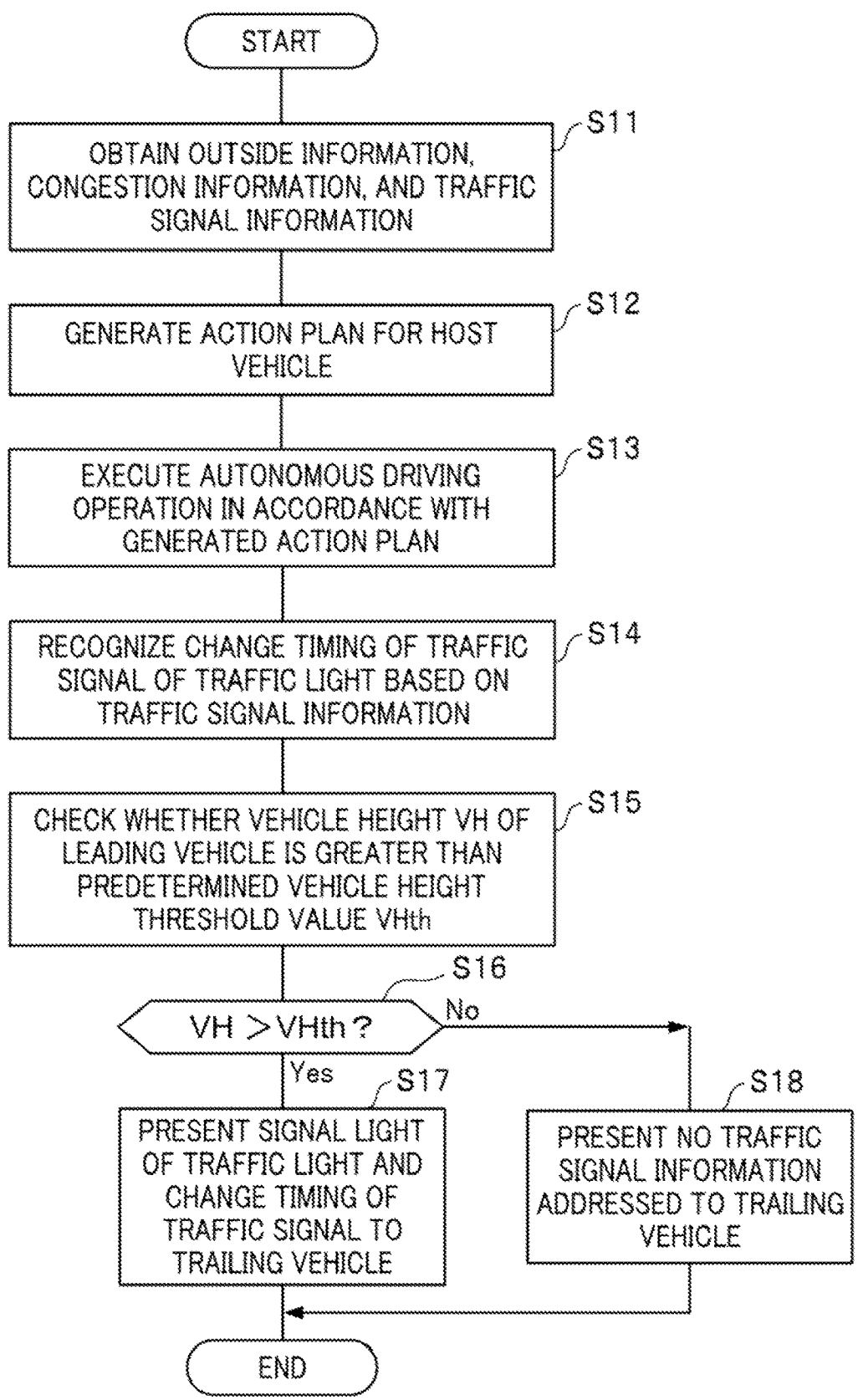
FIG. 7 is a flowchart to be used to describe the operation of the autonomous driving vehicle information presentation apparatus.

FIG. 7 is a flowchart to be used to describe the operation of the autonomous driving vehicle information presentation apparatus 300.

It is assumed that the host vehicle M being an autonomous driving vehicle equipped with the autonomous driving vehicle information presentation apparatus 300 is traveling in a preset autonomous driving mode.

In step S11 illustrated FIG. 7, the outside information obtaining unit 311 obtains outside information containing the traveling state of the leading vehicle 7a detected by the external sensor 10 and present ahead of the host vehicle M in the direction of advance (see FIG. 8A, for example) and the traveling state of the trailing vehicle 8 detected by the external sensor 10 and present behind the host vehicle M in the direction of advance (see FIG. 8A, for example). The congestion information obtaining unit 313 obtains congestion information on congestion ahead of the host vehicle M in the direction of advance. The traffic signal information obtaining unit 315 obtains traffic signal information on the traffic light 6 present at the intersection TJ ahead of the host vehicle M in the direction of advance (see FIG. 8A, for example).

In step S12, the action plan generation unit 144 generates an action plan for the host vehicle M based on the outside information obtained in step S11.

In step S13, the travel control unit 160 (see FIG. 2) executes an autonomous driving operation in accordance with the action plan for the host vehicle M generated by the action plan generation unit 144.

In step S14, the check-recognition unit 321 recognizes the change timing of the traffic signal of the traffic light 6 based on pieces of traffic signal information on the traffic light 6 obtained by the traffic signal information obtaining unit 315 through the two obtaining channels (first and second channels).

In step S15, the vehicle height determination unit 323 checks whether the vehicle height VH of the leading vehicle 7a (see FIG. 8B, for example) present ahead of the host vehicle M in the direction of advance is greater than the predetermined vehicle height threshold value VHth based on the outside information obtained by the outside information obtaining unit 311.

In step S16, if determining that the vehicle height VH of the leading vehicle 7a is greater than the predetermined vehicle height threshold value VHth, the vehicle height determination unit 323 causes the process flow to advance to the next step S17. If, on the other hand, determining that the vehicle height VH of the leading vehicle 7a is not greater than the predetermined vehicle height threshold value VHth, the vehicle height determination unit 323 causes the process flow to advance to step S18.

In the case where the vehicle height VH of the leading vehicle 7a is greater than the predetermined vehicle height threshold value VHth, then in step S17, the information presentation unit 331 presents signal light information expressed by the color in which the signal light of the traffic light 6 present ahead of the host vehicle M in the direction of advance is turned on and information on the change timing of the traffic signal by using the rear display unit 97.

In the case where the vehicle height VH of the leading vehicle 7a is not greater than the vehicle height threshold value VHth, then in step S18, the information presentation unit 331 does not present traffic signal information addressed to the trailing vehicles 8 and 9.

[Operation of Autonomous Driving Vehicle M Equipped with Autonomous Driving Vehicle Information Presentation Apparatus 300 in First Traveling Scene]

Next, the operation of the autonomous driving vehicle M equipped with the autonomous driving vehicle information presentation apparatus 300 in a first traveling scene will be described with reference to FIG. 8A.

FIG. 8A is a diagram used to describe the operation of the autonomous driving vehicle M equipped with the autonomous driving vehicle information presentation apparatus 300 in the first traveling scene.

As illustrated in FIG. 8A, in the first traveling scene of the autonomous driving vehicle M, the host vehicle M is traveling in the direction of the arrow in the diagram, and the traffic light 6 installed at the T-shaped intersection TJ ahead of the host vehicle M in the direction of advance is a red signal (the color of the signal light turned on is a red color 371R (instruction to stop). The circumferential frame of the signal light turned on is clearly indicated by a bold line. The same applies below). A crosswalk 3, a center line 4, and a stop line 5 are drawn at predetermined positions on each of roads 2 on opposite sides of the T-shaped intersection TJ. The host vehicle M illustrated in FIG. 8A is waiting for the traffic signal to change before one of the stop lines 5. The trailing vehicles 8 and 9 are present in a line behind the host vehicle M in the direction of advance.

In this first traveling scene, when, for example, the host vehicle M is a type of vehicle with a relatively large vehicle height VH, it is difficult for the occupants in the trailing vehicles 8 and 9 behind the host vehicle M to recognize the signal light information on the traffic light 6 as the traffic light 6 is hidden by the body of the host vehicle M. In such a case, the occupants in the trailing vehicles 8 and 9 behind the host vehicle M do not know why the host vehicle M is waiting at the stop line 5. The occupants in the trailing vehicles 8 and 9 behind the host vehicle M may thus feel a sense of unease.

To solve this, the autonomous driving vehicle information presentation apparatus 300 according to the embodiment of the present invention included in the host vehicle M presents the signal light information (red color 371R) and information on the change timing of the traffic signal (see red blocks 373R in FIG. 8A; details will be described later) to the trailing vehicles 8 and 9 by using the rear display unit 97 provided in the host vehicle M having stopped at the red signal.

Thus, the host vehicle M can communicate with traffic participants present around the host vehicle M (trailing vehicles 8 and 9) by notifying the occupants in the trailing vehicles 8 and 9 of the reason why the host vehicle M, which is the leading vehicle, has stopped. This enables the autonomous driving vehicle M to further reduce a sense of unease that may be felt by the traffic participants present around the host vehicle M (trailing vehicles 8 and 9).

[Operation of Autonomous Driving Vehicle M Equipped with Autonomous Driving Vehicle Information Presentation Apparatus 300 in Second Traveling Scene]

Next, the operation of the autonomous driving vehicle M equipped with the autonomous driving vehicle information presentation apparatus 300 in a second traveling scene will be described with reference to FIG. 8B.

FIG. 8B is a diagram used to describe operation of the autonomous driving vehicle M equipped with the autonomous driving vehicle information presentation apparatus 300 in the second traveling scene.

As illustrated in FIG. 8B, in the second traveling scene of the autonomous driving vehicle M, the host vehicle M is traveling in the direction of the arrow in the diagram, and the traffic light 6 installed at the T-shaped intersection TJ ahead of the host vehicle M in the direction of advance is a red signal (as in the first traveling scene). The host vehicle M illustrated in FIG. 8B is waiting for the traffic signal to change behind the leading vehicle 7*a* present immediately ahead of the host vehicle M among the leading vehicles 7*a* and 7*b*. The leading vehicle 7*a* is a large truck whose vehicle height VH is above the predetermined vehicle height threshold value VHth. The trailing vehicle 8 is present immediately behind the host vehicle M in the direction of advance.

In this second traveling scene, for example, it is difficult for the occupants in the leading vehicle 7*a* and the trailing vehicle 8 behind it to recognize the signal light information on the traffic light 6 as the traffic light 6 is hidden by the body of the leading vehicle 7*a*. In such a case, the occupants in the host vehicle M and the trailing vehicle 8 behind it do not know why the host vehicle M is waiting at the stop line 5. The occupants in the host vehicle M and the trailing vehicle 8 behind it may thus feel a sense of unease.

To solve this, the autonomous driving vehicle information presentation apparatus 300 according to the embodiment of the present invention included in the host vehicle M presents the signal light information (red color 371R) and information on the change timing of the traffic signal (see the red blocks 373R in FIG. 8B; details will be described later) based on the traffic signal information obtained via the TSPS signal (obtained through the second channel) to the trailing vehicle 8 by using the rear display unit 97 provided in the host vehicle M having stopped at the red signal.

Thus, the host vehicle M can communicate with a traffic participant present around the host vehicle M (trailing vehicle 8) by notifying the occupant in the trailing vehicle 8 of the reason why the leading vehicle 7*a* and the host vehicle M have stopped. This enables the autonomous driving vehicle M to further reduce a sense of unease that may be felt by the traffic participant present around the host vehicle M (trailing vehicle 8).

[First Information Presenting State of Autonomous Driving Vehicle Information Presentation Apparatus 300 Included in Autonomous Driving Vehicle M]

Next, a first information presenting state of the autonomous driving vehicle information presentation apparatus 300 included in the autonomous driving vehicle M will be described with reference to FIGS. 9A to 9E.

FIGS. 9A to 9D are diagrams illustrating the first information presenting state of the autonomous driving vehicle information presentation apparatus 300 included in the autonomous driving vehicle M waiting at a red traffic signal. FIG. 9E is a diagram illustrating the first information presenting state of the autonomous driving vehicle information presentation apparatus 300 included in the autonomous driving vehicle M immediately after the traffic signal has changed to green from red.

In the first information presenting state of the autonomous driving vehicle information presentation apparatus 300 included in the autonomous driving vehicle M, the change timing of the traffic signal light of the traffic light 6 is indicated in a countdown manner along with the current display state of the traffic light 6 by using the rear display unit 97.

Specifically, in the first information presenting state, as illustrated in FIGS. 9A to 9D, when the color of the signal light turned on is the red color 371R, a rough remaining time for which the signal light will be turned on in the red color 371R is presented in a countdown manner by increasing or decreasing the number of horizontally elongated rectangular red blocks 373R, along with the current display state of the traffic light 6 (see the red color 371R) by using the rear display unit 97.

Figure 9A:
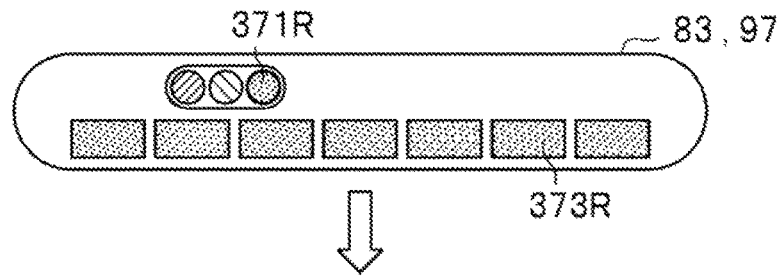
FIG. 9A is a diagram illustrating a first information presenting state of the autonomous driving vehicle information presentation apparatus included in the autonomous driving vehicle waiting at a red traffic signal.
Figure 9B:
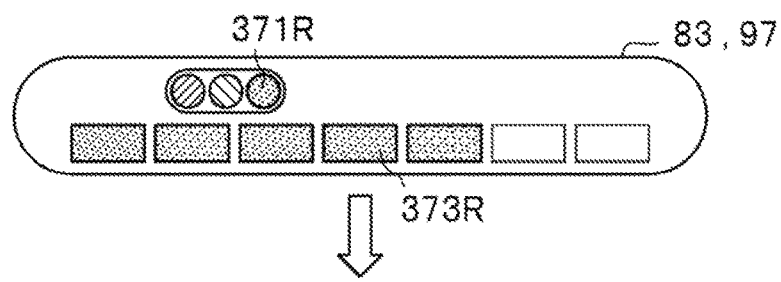
FIG. 9B is a diagram illustrating the first information presenting state of the autonomous driving vehicle information presentation apparatus included in the autonomous driving vehicle waiting at a red traffic signal.
Figure 9C:
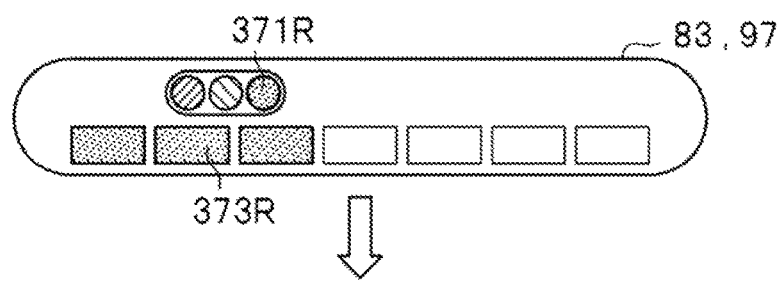
FIG. 9C is a diagram illustrating the first information presenting state of the autonomous driving vehicle information presentation apparatus included in the autonomous driving vehicle waiting at a red traffic signal.
Figure 9D:
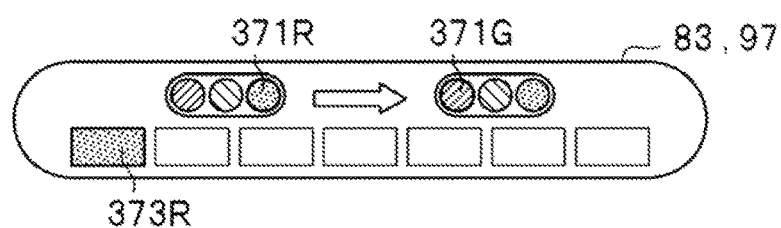
FIG. 9D is a diagram illustrating the first information presenting state of the autonomous driving vehicle information presentation apparatus included in the autonomous driving vehicle waiting at a red traffic signal.
Figure 9E:
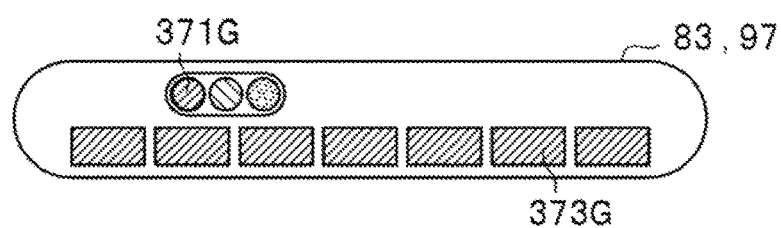
FIG. 9E is a diagram illustrating the first information presenting state of the autonomous driving vehicle information presentation apparatus included in the autonomous driving vehicle immediately after the traffic signal has changed to green from red.

In FIG. 9D, that the color of the signal light turned on is about to change soon from the red color 371R to a green color 371G is presented with the number of horizontally elongated rectangular red blocks 373R (the number of blocks 373: one block) along with a design indicating changing of the color of the signal light turned on.

Also, in FIG. 9E, that the color of the signal light turned on has just changed from the red color 371R to the green color 371G is presented with the number of horizontally elongated rectangular green blocks 373G (the number of blocks 373: seven blocks) as a rough remaining time for which the signal light will be turned on in the green color 371G, along with the current display state of the traffic light 6 (see the green color 371G).

Note that the first information presenting state illustrated in FIG. 9E is preferably used when the change timings of the traffic signal obtained through the two obtaining channels (first and second channels) do not match each other.

Specifically, in a case where, for example, the signal light color based on the traffic signal information obtained via the TSPS signal (obtained through the second channel) is red whereas the signal light color based on the traffic signal information obtained via the signal light image of the traffic light 6 (obtained through the first channel) is green, the first information presenting state illustrated in FIG. 9E is used to instantly switch the displayed content of the traffic signal information. This can prevent a situation where a traffic participant present around the host vehicle M (trailing vehicle 3) gets confused by a mismatch between the signal light color of the traffic light 6 and the traffic signal information presented using the rear display unit 97.

[Second Information Presenting State of Autonomous Driving Vehicle Information Presentation Apparatus 300 Included in Autonomous Driving Vehicle M]

Next, a second information presenting state of the autonomous driving vehicle information presentation apparatus 300 included in the autonomous driving vehicle M will be described with reference to FIGS. 10A to 10E.

Figure 10A:
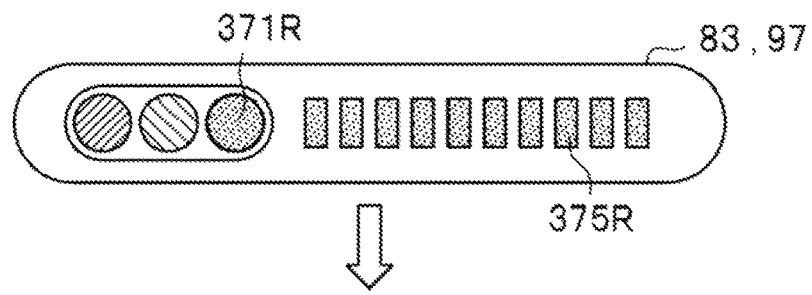
FIG. 10A is a diagram illustrating a second information presenting state of the autonomous driving vehicle information presentation apparatus included in the autonomous driving vehicle waiting at a red traffic signal.
Figure 10B:
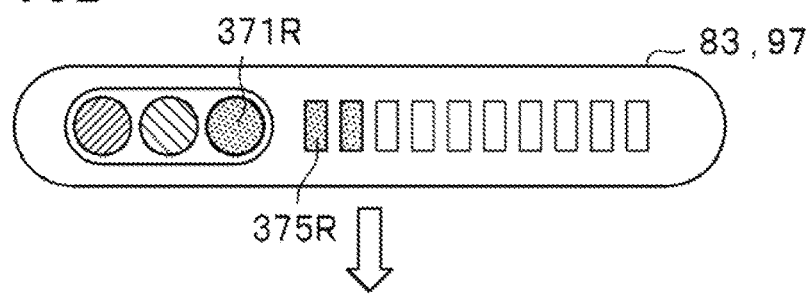
FIG. 10B is a diagram illustrating the second information presenting state of the autonomous driving vehicle information presentation apparatus included in the autonomous driving vehicle waiting at a red traffic signal.
Figure 10C:
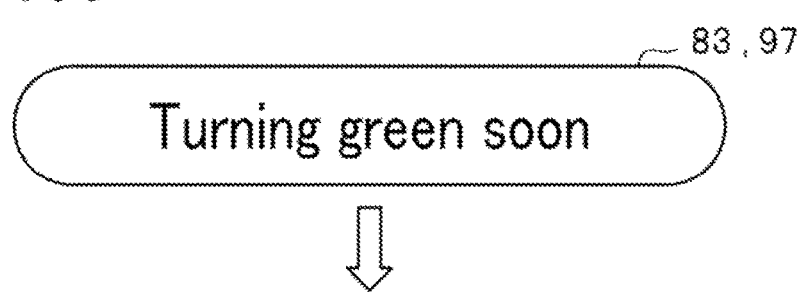
FIG. 10C is a diagram illustrating the second information presenting state of the autonomous driving vehicle information presentation apparatus included in the autonomous driving vehicle waiting at a red traffic signal.
Figure 10D:
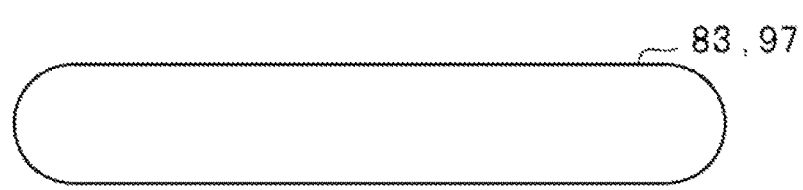
FIG. 10D is a diagram illustrating the second information presenting state of the autonomous driving vehicle information presentation apparatus included in the autonomous driving vehicle immediately after the traffic signal has changed to green from red.
Figure 10E:
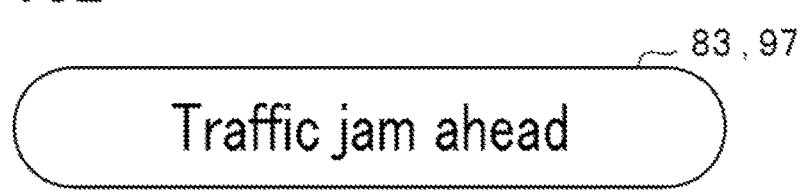
FIG. 10E is a diagram illustrating the second information presenting state of the autonomous driving vehicle information presentation apparatus included in the autonomous driving vehicle after the traffic signal has changed to green from red but the intersection is congested.

FIGS. 10A to 10C are diagrams illustrating the second information presenting state of the autonomous driving vehicle information presentation apparatus 300 included in the autonomous driving vehicle M waiting at a red traffic signal. FIG. 10D is a diagram illustrating the second information presenting state of the autonomous driving vehicle information presentation apparatus 300 included in the autonomous driving vehicle M immediately after the traffic signal has changed to green from red. FIG. 10E is a diagram illustrating the second information presenting state of the autonomous driving vehicle information presentation apparatus 300 included in the autonomous driving vehicle M after the traffic signal has changed to green from red but the intersection TJ is congested.

In the second information presenting state of the autonomous driving vehicle information presentation apparatus 300 included in the autonomous driving vehicle M, the change timing of the traffic signal light of the traffic light 6 is indicated in a countdown manner along with the current display state of the traffic light 6 by using the rear display unit 97, as in the first information presenting state.

Specifically, in the second information presenting state, as illustrated in FIGS. 10A and 10B, when the color of the signal light turned on is the red color 371R, a rough remaining time for which the signal light will be turned on in the red color 371R is presented in a countdown manner by increasing or decreasing the number of vertically elongated rectangular blocks 375, along with the current display state of the traffic light 6 (see the red color 371R) by using the rear display unit 97.

Also, in the second information presenting state, in addition to the above-described presenting state, that the traffic signal is about to change soon from red to green is presented by using a character message "Turning green soon" with the rear display unit 97, as illustrated in FIG. 10C.

Also, in the second information presenting state, when the traffic signal is green, information indicating so is not presented, as illustrated in FIG. 10D.

Further, in the second information presenting state, if the traffic signal has changed from red to green but the T-shaped intersection TJ is congested, thereby requiring the vehicles to remain stopped, that it is impossible to move forward due to the traffic congestion is presented by using a character message "Traffic jam ahead" with the rear display unit 97, as illustrated in FIG. 10E.

[Operation and Advantageous Effects of Autonomous Driving Vehicle Information Presentation Apparatuses 300 According to Embodiments of Present Invention]

Next, operation and advantageous effects of the autonomous driving vehicle information presentation apparatuses 300 according to the embodiments of the present invention will be described.

An autonomous driving vehicle information presentation apparatus 300 based on an aspect (1) is an autonomous driving vehicle information presentation apparatus 300 that is used in an autonomous driving vehicle which obtains outside information on an outside including a leading vehicle 7a present ahead of a host vehicle M in a direction of advance, generates an action plan for the host vehicle M based on the obtained outside information, and autonomously controls at least one of speed and steering of the host vehicle M in accordance with the generated action plan, and that presents information to a traffic participant (trailing vehicle 8) present around the host vehicle M.

This autonomous driving vehicle information presentation apparatus 300 employs a configuration which includes: a traffic signal information obtaining unit 315 that obtains traffic signal information on a traffic light 6 present at an intersection TJ ahead of the host vehicle M in the direction of advance; a check-recognition unit (recognition unit) 321 that recognizes change timing of a traffic signal of the traffic light 6 based on the traffic signal information on the traffic light 6 obtained by the traffic signal information obtaining unit 315; and an information presentation unit 331 that presents traffic signal information including an instruction to stop, a warning for advance, or a permission to advance expressed by the traffic signal of the traffic light 6, by using a rear display unit 97 (exterior display apparatus 83) provided at a position in a rear portion of a cabin of the host vehicle M at which the rear display unit 97 is visible to an occupant in the trailing vehicle 8, and in which the information presentation unit 331 presents the traffic signal information further containing the change timing of the traffic signal of the traffic light 6 recognized by the check-recognition unit 321, by using the rear display unit 97.

In the autonomous driving vehicle information presentation apparatus 300 based on the aspect (1), the traffic signal information obtaining unit 315 obtains the traffic signal information on the traffic light 6 present at the intersection TJ ahead of the host vehicle M in the direction of advance. The check-recognition unit 321 recognizes the change timing of the traffic signal of the traffic light 6 based on the traffic signal information on the traffic light 6 obtained by the traffic signal information obtaining unit 315. The information presentation unit 331 presents traffic signal information including an instruction to stop, a warning for advance, or a permission to advance expressed by the traffic signal of the traffic light 6, by using the rear display unit 97 provided at a position in the rear portion of the cabin of the host vehicle M at which the rear display unit 97 is visible to the occupant in the trailing vehicle 8.

In particular, the information presentation unit 331 presents the traffic signal information further containing the change timing of the traffic signal of the traffic light 6 recognized by the check-recognition unit 321, by using the rear display unit 97.

According to the autonomous driving vehicle information presentation apparatus 300 based on the aspect (1), the information presentation unit 331 presents traffic signal information including an instruction to stop, a warning for advance, or a permission to advance and also traffic signal information further containing the change timing of the traffic signal of the traffic light 6 by using the rear display unit 97. This enables the autonomous driving vehicle M to further reduce a sense of unease that may be felt by a traffic participant present around the host vehicle M (trailing vehicle 8).

An autonomous driving vehicle information presentation apparatus 300 based on an aspect (2) is the autonomous driving vehicle information presentation apparatus 300 based on the aspect (1) employing a configuration in which the traffic signal information obtaining unit 315 obtains pieces of traffic signal information on the traffic light 6 through two obtaining channels including a first channel for obtaining traffic signal information by image processing of a signal light image of the traffic light 6, and a second channel for obtaining traffic-signal information by signal decoding of a traffic signal prediction system (TSPS) signal obtained via a TSPS, and the check-recognition unit (recognition unit) 321 checks the pieces of traffic signal information obtained through the two obtaining channels against each other and, if a result of the check indicates that change timings of the traffic signal obtained respectively through the two obtaining channels do not match each other, the check-recognition unit 321 handles the traffic signal information obtained via the signal light image of the traffic light 6 with priority over the traffic signal information obtained via the TSPS signal.

In the autonomous driving vehicle information presentation apparatus 300 based on the aspect (2), the traffic signal information obtaining unit 315 obtains pieces of traffic signal information on the traffic light 6 through the two obtaining channels including the first channel for obtaining traffic signal information by the image processing of the signal light image of the traffic light 6, and the second channel for obtaining traffic signal information by the signal decoding of the TSPS signal obtained via the TSPS.

The check-recognition unit (recognition unit) 321 checks the pieces of traffic signal information obtained through the two obtaining channels against each other and, if the result of the check indicates that the change timings of the traffic signal obtained through the two obtaining channels do not match each other, the check-recognition unit 321 handles the traffic signal information obtained via the signal light image of the traffic light 6 (obtained through the first channel) with priority over the traffic signal information obtained via the TSPS signal (obtained through the second channel).

According to the autonomous driving vehicle information presentation apparatus 300 based on the aspect (2), if the change timings of the traffic signal obtained through the two obtaining channels do not match each other, the traffic signal information obtained via the signal light image of the traffic light 6 (obtained through the first channel) is handled with priority over the traffic signal information obtained via the TSPS signal (obtained through the second channel). This can prevent a situation where a traffic participant present around the host vehicle M (trailing vehicle 8) gets confused by a mismatch between the signal light color of the traffic light 6 and the traffic signal information presented using the rear display unit 97.

An autonomous driving vehicle information presentation apparatus 300 based on an aspect (3) is the autonomous driving vehicle information presentation apparatus 300 based on the aspect (1) or (2) employing a configuration which further includes a vehicle height determination unit 323 that determines whether a vehicle height VH of a leading vehicle 7a present ahead of the host vehicle M in the direction of advance is greater than a predetermined vehicle height threshold value VHth based on the outside information, and in which the information presentation unit 331 presents the traffic signal information by using the rear display unit 97 when the vehicle height determination unit 323 determines that the vehicle height VH of the leading vehicle 7a is greater than the predetermined vehicle height threshold value VHth.

In the autonomous driving vehicle information presentation apparatus 300 based on the aspect (3), the vehicle height determination unit 323 determines whether the vehicle height VH of the leading vehicle 7a present ahead of the host vehicle M in the direction of advance is greater, than the predetermined vehicle height threshold value VHth based on the outside information. The information presentation unit 331 presents the traffic signal information by using the rear display unit 97 when the vehicle height determination unit 323 determines that the vehicle height VH of the leading vehicle 7a is greater than the predetermined vehicle height threshold value VHth.

According to the autonomous driving vehicle information presentation apparatus 300 based on the aspect (3), the information presentation unit 331 presents the traffic signal information by using the rear display unit 97 when the vehicle height determination unit 323 determines that the vehicle height VH of the leading vehicle 7a is greater than the predetermined vehicle height threshold value VHth. Thus, even when it is difficult for the occupant in the trailing vehicle 8 to figure out traffic signal information as the traffic signal information is blocked by the body of the leading vehicle 7a, the traffic signal information can be presented to the trailing vehicle 8.

This enables the autonomous driving vehicle M to further reduce a sense of unease that may be felt by a traffic participant present around the host vehicle M (trailing vehicle 8) and also create a smooth traffic environment.

An autonomous driving vehicle information presentation apparatus 300 based on an aspect (4) is the autonomous driving vehicle information presentation apparatus 300 based on any one of the aspects (1) to (3) employing a configuration which further includes a congestion information obtaining unit 313 that obtains congestion information on congestion ahead of the host vehicle M in the direction of advance, and in which when the congestion information obtaining unit 313 obtains congestion information indicating that traffic congestion has occurred ahead of the host vehicle M in the direction of advance, the information presentation unit 331 presents the obtained congestion information by using the exterior display apparatus.

In the autonomous driving vehicle information presentation apparatus 300 based on the aspect (4), the congestion information obtaining unit 313 obtains congestion information on congestion ahead of the host vehicle M in the direction of advance. When the congestion information obtaining unit 313 obtains congestion information indicating that traffic congestion has occurred ahead of the host vehicle M in the direction of advance, the information presentation unit 331 presents the obtained congestion information by using the rear display unit 97.

According to the autonomous driving vehicle information presentation apparatus 300 based on the aspect (4), when the congestion information obtaining unit 313 obtains congestion information indicating that traffic congestion has occurred ahead of the host vehicle M in the direction of advance, the information presentation unit 331 presents the obtained congestion information by using the rear display unit 97. Thus, the host vehicle M can notify the occupant in the trailing vehicle 8 of the congestion information obtained by the congestion information obtaining unit 313.

In this way, the host vehicle M can communicate with a traffic participant present around the host vehicle M (trailing vehicle 8). This makes it possible to create a smooth traffic environment even when unpredicted traffic congestion occurs.

An autonomous driving vehicle information presentation apparatus 300 based on an aspect (5) is the autonomous driving vehicle information presentation apparatus 300 based on any one of the aspects (1) to (4) employing a configuration in which the information presentation unit 331 presents the change timing of the traffic signal of the traffic light 6 by increasing or decreasing the number of blocks 373 to indicate a remaining time left before the traffic signal changes.

According to the autonomous driving vehicle information presentation apparatus 300 based on the aspect (5), the information presentation unit 331 presents the change timing of the traffic signal of the traffic light 6 by increasing or decreasing the number of blocks 373 to indicate the remaining time left before the traffic signal changes.

According to the autonomous driving vehicle information presentation apparatus 300 based on the aspect (5), the information presentation unit 331 presents the change timing of the traffic signal of the traffic light 6 by increasing or decreasing the number of blocks 373 to indicate the remaining time left before the traffic signal changes. Thus, the host vehicle M can notify the occupant in the trailing vehicle 8 of the change timing of the traffic signal of the traffic light 6 in a manner in which the change timing is easily recognizable at a glance.

In this way, the host vehicle M can communicate with a traffic participant present around the host vehicle M (trailing vehicle 8). This makes it possible to create a smooth traffic environment even when unpredicted traffic congestion occurs.

Other Embodiments

The plurality of embodiments described above represent examples of embodying the present invention. Therefore, the technical scope of the present invention shall not be interpreted in a limited manner by these embodiments. This is because the present invention can be implemented in various ways without departing from its gist or its main characteristic features.

For example, in the description of the autonomous driving vehicle information presentation apparatuses 300 according to the embodiments of the present invention, "trailing vehicle" is defined to mean a vehicle that is traveling immediately behind the host vehicle M among the nearby vehicles. However, the present invention is not limited to this example.

"Trailing vehicle" may be defined to mean vehicles in general traveling ahead of the host vehicle M in the direction of advance among the nearby vehicles. "Trailing vehicle" in this case also includes a vehicle traveling in a traveling lane different from that of the host vehicle M (the direction of travel is the same as that of the host vehicle M), as well as a vehicle traveling in the same traveling lane as that of the host vehicle M.

Lastly, the present invention can be implemented by providing a program that implements one or more of the functions according to the above-described embodiments to a system or an apparatus via a network or from a storage medium, and causing one or more processors in a computer of the system or the apparatus to read out and execute the program. Alternatively, the present invention may be implemented with a hardware circuit (e.g., ASIC) that implements one or more of the functions. Information including the program that implements the functions can be held in a recording apparatus such as a memory or a HDD or a recording medium such as a memory card or an optical disk.

What is claimed is:

1. An autonomous driving vehicle information presentation apparatus that is used in an autonomous driving vehicle which obtains outside information on an outside including a traffic participant present around a host vehicle, generates an action plan for the host vehicle based on the obtained outside information, and autonomously controls at least one of speed and steering of the host vehicle in accordance with the generated action plan, and that presents information to the traffic participant, the autonomous driving vehicle information presentation apparatus comprising:
    a traffic signal information obtaining unit that obtains traffic signal information on a traffic light present at an intersection ahead of the host vehicle in a direction of advance,
    a recognition unit that recognizes change timing of a traffic signal of the traffic light based on the traffic signal information on the traffic light obtained by the traffic signal information obtaining unit; and
    an information presentation unit that presents traffic signal information including an instruction to stop, a warning for advance, or a permission to advance expressed by the traffic signal of the traffic light, by using an exterior display apparatus provided at a position in a rear portion of a cabin of the host vehicle at which the exterior display apparatus is visible to an occupant in a trailing vehicle,
    wherein
    the information presentation unit presents the traffic signal information further containing the change timing of the traffic signal of the traffic light recognized by the recognition unit, by using the exterior display apparatus,
    the traffic signal information obtaining unit obtains pieces of traffic signal information on the traffic light through two obtaining channels, one of which involves a signal light image of the traffic light and the other of which involves a traffic signal prediction system signal obtained via a traffic signal prediction system, and
    the recognition unit checks the pieces of traffic signal information obtained through the two obtaining channels against each other and, if a result of the check indicates that change timings of the traffic signal obtained respectively through the two obtaining channels do not match each other, the recognition unit handles the traffic signal information obtained via the signal light image of the traffic light with priority over the traffic signal information obtained via the traffic signal prediction system signal.

2. The autonomous driving vehicle information presentation apparatus according to claim 1, further comprising
    a vehicle height determination unit that determines whether a vehicle height of a leading vehicle present ahead of the host vehicle in the direction of advance is greater than a predetermined vehicle height threshold value based on the outside information,
    wherein the information presentation unit presents the traffic signal information by using the exterior display apparatus when the vehicle height determination unit determines that the vehicle height of the leading vehicle is greater than the predetermined vehicle height threshold value.

3. The autonomous driving vehicle information presentation apparatus according to claim 1, further comprising
    a congestion information obtaining unit that obtains congestion information on congestion ahead of the host vehicle in the direction of advance,
    wherein when the congestion information obtaining unit obtains congestion information indicating that traffic congestion has occurred ahead of the host vehicle in the direction of advance, the information presentation unit presents the obtained congestion information by using the exterior display apparatus.

4. The autonomous driving vehicle information presentation apparatus according to claim 1, wherein the information presentation unit presents the change timing of the traffic signal of the traffic light by increasing or decreasing the number of blocks to indicate a remaining time left before the traffic signal changes.

* * * * *